United States Patent [19]

Nakazawa et al.

[11] Patent Number: 5,438,669
[45] Date of Patent: Aug. 1, 1995

[54] DATA PROCESSOR WITH IMPROVED LOOP HANDLING UTILIZING IMPROVED REGISTER ALLOCATION

[75] Inventors: Kisaburo Nakazawa, 29-10, Sagamidai-6-chome, Sagamihara-shi; Hiroshi Nakamura, 1043, Namiki-4-chome, Tsukuba-shi; Hiromitsu Imori, 23-6, Amakubo-2-chome, Tsukuba-shi; Hideo Wada, Hadano, all of Japan

[73] Assignees: Hitachi, Ltd., Tokyo; Kisaburo Nakazawa, Sagamihara; Hiroshi Nakamura, Tsukuba; Hiromitsu Imori, Tsukuba, all of Japan

[21] Appl. No.: 977,298

[22] Filed: Nov. 16, 1992

[30] Foreign Application Priority Data

Nov. 20, 1991 [JP] Japan .................. 3-304476
Mar. 31, 1992 [JP] Japan .................. 4-076608

[51] Int. Cl.⁶ .............................. G06F 3/00
[52] U.S. Cl. ......................... 395/375; 395/800; 395/421.02; 395/421.05; 395/412; 364/729.3; 364/247.6; 364/247.7; 364/263.3; 364/DIG. 1
[58] Field of Search ............... 395/800, 375, 250, 425, 395/200, 400, 800; 364/DIG. 1, DIG. 2, 229.3, 247.6, 247.7, 263.3

[56] References Cited

U.S. PATENT DOCUMENTS

| | | | |
|---|---|---|---|
| 4,376,297 | 3/1983 | Anderson et al. | 395/400 |
| 4,435,765 | 3/1984 | Uchida et al. | 395/550 |
| 4,569,018 | 2/1986 | Hummel et al. | 395/425 |
| 4,574,349 | 3/1986 | Rechtchaffen | 395/425 |
| 4,580,240 | 4/1986 | Watanabe | 395/425 |
| 4,617,625 | 10/1986 | Nagashima et al. | 395/800 |
| 4,755,931 | 7/1988 | Abe | 395/800 |
| 4,760,545 | 7/1988 | Inagami et al. | 395/800 |
| 4,812,974 | 3/1989 | Wada et al. | 395/375 |
| 4,888,682 | 12/1989 | Ngai et al. | 395/800 |
| 4,942,525 | 7/1990 | Shintani et al. | 395/375 |
| 5,036,453 | 7/1991 | Renner et al. | 395/800 |
| 5,179,682 | 1/1993 | Jensen | 395/425 |
| 5,214,786 | 5/1993 | Watanabe et al. | 395/800 |

FOREIGN PATENT DOCUMENTS

0220682A3 5/1987 European Pat. Off. .
0348030A2 12/1989 European Pat. Off. .
57-166649 10/1982 Japan .
2228116A 8/1990 United Kingdom .

OTHER PUBLICATIONS

Garner et al. "The Scalable Processor Architecture (SPARC)" IEEE 1988, pp. 278-283.
Halstead, Jr. et al. "MASA: A Multi-Threaded Processor Architecture for Parallel Symbolic Computing" IEEE 1988, pp. 443-451.
Miller, D. R., et al. "Exploiting Large Register Sets," Microprocessors and Microsystems, vol. 14, No. 6, Jul./Aug. 1990, pp. 333-340 (English).
Dehnert, James C., et al. "Overlapped Loop Support in the Cydra 5," Computer Architecture News, vol. 17, No. 2, Apr. 1989, pp. 26-38. (English).
Hennessy, J. L. and D. A. Patterson, *Computer Architecture: A Quantitative Approach*, Morgan Kaufmann Publishers, Inc., 1990, pp. 314-318 and 450-454. (in English) (items 2 and 3 on the Information Disclosure Statement).

*Primary Examiner*—Alyssa H. Bowler
*Assistant Examiner*—Dzung C. Nguyen
*Attorney, Agent, or Firm*—Fay, Sharpe, Beall, Fagan, Minnich & McKee

[57] ABSTRACT

A plurality of physical registers greater in number than can be addressed by instructions are provided. The physical registers are divided into a plurality of partial groups or windows. Each of the physical registers is specified by a physical register number determined by a combination of the number of the window and a register number contained in the window. The window number is indicated by a current floating point window pointer stored in a current floating point window pointer register. In executing a vector calculation program having repetitive loops of an instruction sequence, the window is changed for each loop by changing the value of the current floating point window pointer. Vector data to be calculated at the i-th loop is read from a main memory at the loop before the i-th loop. The calculated result of the vector data at the i-th loop is stored in the main memory at the loop after the i-th loop, thereby eliminating performance degradation to be caused by a slow data read time and improving the operation speed.

13 Claims, 18 Drawing Sheets

FIG. 1
PHYSICAL FLOATING POINT REGISTER NUMBER
PHYSICAL FLOATING POINT REGISTER
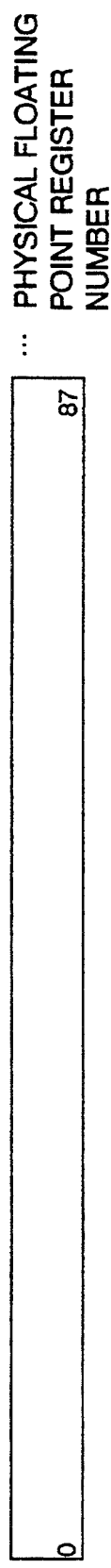
... LOGICAL FLOATING POINT REGISTER NUMBER
WINDOW 0 (W0)
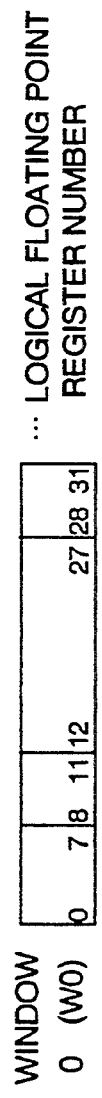
WINDOW 1 (W1)
WINDOW 2 (W2)
WINDOW 3 (W3)
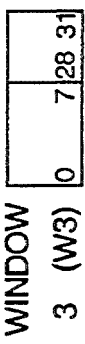

FIG. 2

PHYSICAL GENERAL REGISTER

```
WINDOW            0  7 8  11 12    27 28 31      ... PHYSICAL GENERAL
0 (WG0)                                              REGISTER NUMBER
                                              87

... LOGICAL GENERAL REGISTER NUMBER OR
                                                     LOGICAL FLOATING POINT REGISTER
                                                     NUMBER

WINDOW            0         7
1 (WG1)
                     8  11 12    27 28 31

WINDOW            0         7
2 (WG2)
                                 8  11 12    27 28 31

WINDOW            0       7 28 31
3 (WG3)
                                              8  11 12    27
```

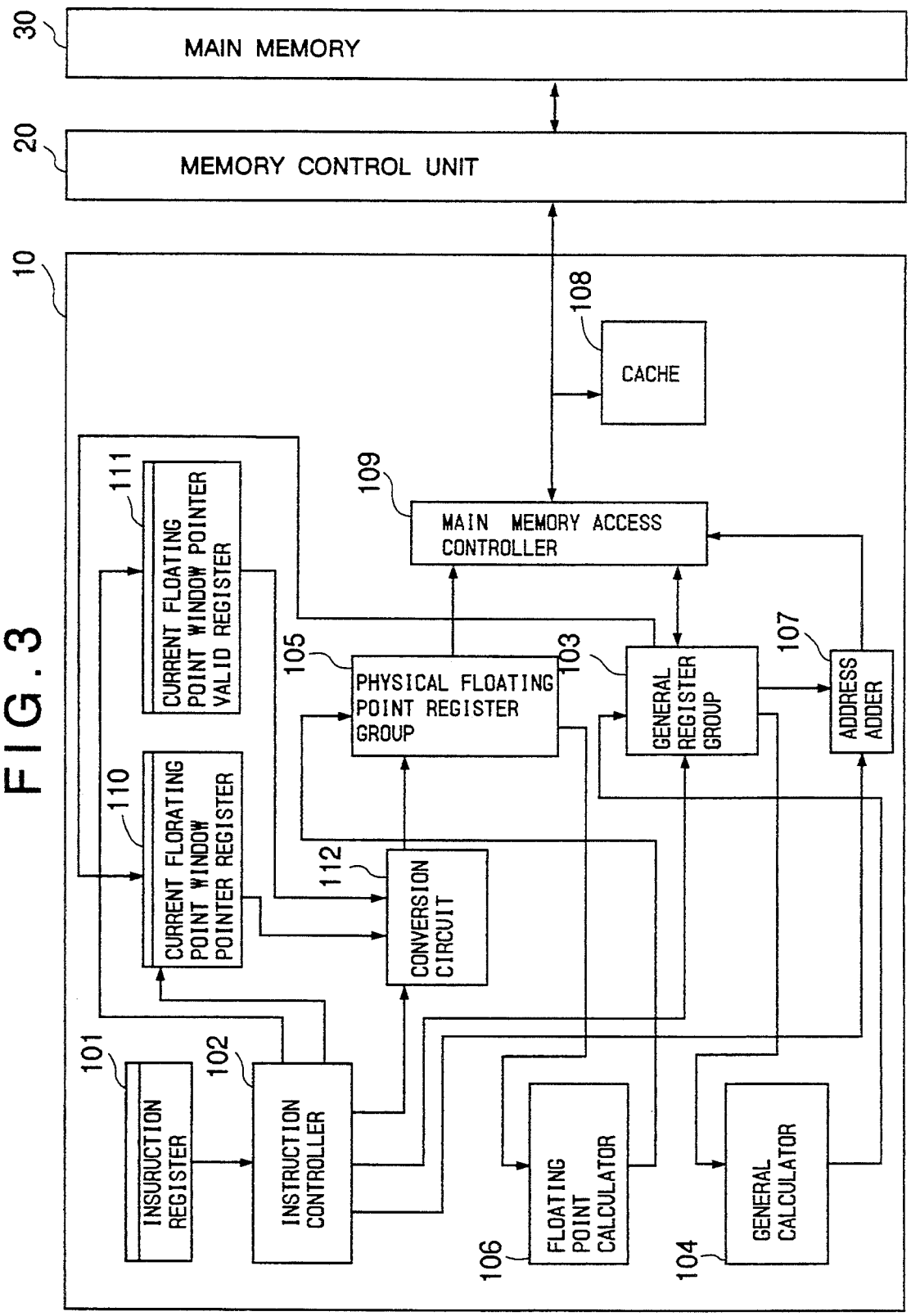

FIG. 4A

CURRENT FLOATING POINT WINDOW POINTER CHANGE INSTRUCTION

| INSTRUCTION CODE | UNUSED | GR NO. |
|---|---|---|

FIG. 4B

FLOATING POINT REGISTER PRELOAD INSTRUCTION

| INSTRUCTION CODE | UNUSED | FR NO. | GR NO. | INCREMENT |
|---|---|---|---|---|

FIG. 4C

EXTENDED FLOATING POINT REGISTER PRELOAD INSTRUCTION

| INSTRUCTION CODE | UNUSED | FR NO. | GR NO. | INCREMENT |
|---|---|---|---|---|

FIG. 4D

FLOATING POINT REGISTER POSTSTORE INSTRUCTION

| INSTRUCTION CODE | UNUSED | FR NO. | GR NO. | INCREMENT |
|---|---|---|---|---|

FR : FLOATING POINT REGISTER

GR: GENERAL REGISTER

FIG. 6A
CURRENT FLOATING POINT WINDOW POINTER CHANGE INSTRUCTION

| INSTRUCTION CODE | UNUSED | GR NO. |
|---|---|---|

FIG. 6B
CURRENT GENERAL WINDOW POINTER CHANGE INSTRUCTION

| INSTRUCTION CODE | UNUSED | GR NO. |
|---|---|---|

FIG. 6C
FLOATING POINT REGISTER PRELOAD INSTRUCTION

| INSTRUCTION CODE | UNUSED | FR NO. | GR NO. | INCREMENT |
|---|---|---|---|---|

FIG. 6D
EXTENDED FLOATING POINT REGISTER PRELOAD INSTRUCTION

| INSTRUCTION CODE | UNUSED | FR NO. | GR NO. | INCREMENT |
|---|---|---|---|---|

FIG. 6E
FLOATING POINT REGISTER POSTSTORE INSTRUCTION

| INSTRUCTION CODE | UNUSED | FR NO. | GR NO. | INCREMENT |
|---|---|---|---|---|

FIG. 6F
FLOATING POINT REGISTER LIST LOAD INSTRUCTION

| INSTRUCTION CODE | UNUSED | FR NO. | GR UNUSED |
|---|---|---|---|

FIG. 6G
GENERAL REGISTER LIST LOAD INSTRUCTION

| INSTRUCTION CODE | UNUSED | FR NO.1 | GR NO.2 | INCREMENT |
|---|---|---|---|---|

FIG. 6H
FLOATING POINT REGISTER LIST STORE INSTRUCTION

| INSTRUCTION CODE | UNUSED | FR NO. | GR UNUSED |
|---|---|---|---|

FR : FLOATING POINT REGISTER

GR : GENERAL REGISTER

FIG. 7
(PRIOR ART)

| No. | RELATIVE ADDRESS | INSTRUCTION STRING | OPERATION |
|---|---|---|---|
| 1 | LOOP | FLDM 8(GR1), FR12 | 8-BYTE DATA IS READ OUT FROM MMA SPECIFIED BY GR 1 AND STORED IN FR 12. THAT IS, A(i) IS SET IN THE FR 12. THEN THE VALUE OF GR 1 IS ADDED WITH 8. THAT IS, GR 1 BECOMES MMA OF A(i+1). |
| 2 | LOOP | FLDM 8(GR2), FR13 | 8-BYTE DATA IS READ OUT FROM MMA SPECIFIED BY GR 2 AND STORED IN FR 13. THAT IS, B(i) IS SET IN FR 13. THEN THE VALUE OF GR 2 IS ADDED WITH 8. THAT IS, GR 2 BECOMES MMA OF B(i+1). |
| 3 |  | FADD FR20, FR12,FR13 | THE VALUE OF FR 12 AND THE VALUE OF FR 13 ARE ADDED UP AND STORED IN FR 20. THAT IS, A(i)+B(i) ENTERS FR 20. |
| 4 | LOOP | FSTM 8(GR3), FR20 | THE VALUE OF FR 20 IS STORED IN MMA INDICATED BY GR 3. THAT IS, A(i)+B(i) ENTERS C(i). THEN THE VALUE OF GR 3 IS ADDED WITH 8. THAT IS, GR 3 BECOMES MMA OF C(i+1). |
| 5 |  | BCNT GR 4, LOOP | THE VALUE OF GR 4 IS DECREMENTED BY 1. IF THE DECREMENTED RESULT IS NOT ZERO, THE PROGRAM BRANCHES INTO AN ADDRESS "LOOP." THAT IS, IF i < N, THE PROGRAM RETURNS TO "LOOP." |

GR : GENERAL REGISTER
FR : FLOATING POINT REGISTER
MMA : MAIN MEMORY ADDRESS

FIG. 8
(PRIOR ART)

| No. | RELATIVE ADDRESS | INSTRUCTION STRING | OPERATION |
|---|---|---|---|
| 1 | LOOP | GLDM 8(GR1),GR20 | (GR1)→GR20 (L(i)) |
| 2 | | FLDM 0(GR20),FR20 | (GR20)→FR20 ( B(Li(i))) |
| 3 | | FSTM 8(GR2),FR20 | FR20→MMA SPECIFIED BY GR2 (ADDRESS OF A(i)) |
| 4 | | BCNT GR4, LOOP | IF i<N, PROGRAM RETURNS TO LOOP. |

(NOTE1) GR : GENERAL REGISTER
FR : FLOATING POINT REGISTER
MMA : MAIN MEMORY ADDRESS
(NOTE2) THE ARROW —INDICATES THE FLOW OF DATA.

FIG. 9
(PRIOR ART)

| No. | RELATIVE ADDRESS | INSTRUCTION STRING | OPERATION |
|---|---|---|---|
| 1 | LOOP | GLDM 8(GR1),GR20 | (GR1)→GR20 (L(i)) |
| 2 | | FLDM 0(GR2),FR20 | (GR2)→FR20 (B(i)) |
| 3 | | FSTM 8(GR20),FR20 | FR20→MMA SPECIFIED BY GR20 (ADDRESS OF A(Li(i))) |
| 4 | | BCNT GR4, LOOP | IF i<N, PROGRAM RETURNS TO LOOP. |

(NOTE1) GR : GENERAL REGISTER
FR : FLOATING POINT REGISTER
MMA : MAIN MEMORY ADDRESS
(NOTE2) THE ARROW —INDICATES THE FLOW OF DATA.

FIG. 10
(PRIOR ART)

| No. | RELATIVE ADDRESS | INSTRUCTION STRING | OPERATION |
|---|---|---|---|
| 1 | LOOP | GLDM 8(GR1),GR20 | (GR1)→GR20 (L(i)) |
| 2 | | FLDM 8(GR2),FR21 | (GR2)→FR21 (B(i)) |
| 3 | | FLDM 0(GR20),FR20 | (GR20)→FR20 (A(Li(i))) |
| 4 | | FADD FR20,FR21 | FR20+FR21→FR20( A(Li(i)) +B(i)) |
| 5 | | FSTM 0(GR20),FR20 | FR20→MMA SPECIFIED BY GR2 (ADDRESS OF A(Li(i)))) |
| 6 | | BCNT GR4,LOOP | IF i<N, PROGRAM RETURNS TO LOOP. |

FIG. 11

| No. | RELATIVE ADDRESS | INSTRUCTION STRING | OPERATION |
|---|---|---|---|
| 1 | LOOP | FLDM 8(GR1),FR12 | A(i)→FR12 |
| 2 | | FLDM 8(GR2),FR13 | B(i)→FR13 |
| 3 | | FLDM 8(GR1),FR14 | A(i+1)→FR14 |
| 4 | | FLDM 8(GR2),FR15 | B(i+1)→FR15 |
| 5 | | FLDM 8(GR1),FR16 | A(i+2)→FR16 |
| 6 | | FLDM 8(GR2),FR17 | B(i+2)→FR17 |
| 7 | | FLDM 8(GR1),FR18 | A(i+3)→FR18 |
| 8 | | FLDM 8(GR2),FR19 | B(i+3)→FR19 |
| 9 | | FADD FR20,FR12,FR13 | A(i)+B(i)→FR20 |
| 10 | | FADD FR21,FR14,FR15 | A(i+1)+B(i+1)→FR21 |
| 11 | | FADD FR22,FR16,FR17 | A(i+2)+B(i+2)→FR22 |
| 12 | | FADD FR23,FR18,FR19 | A(i+3)+B(i+3)→FR23 |
| 13 | | FSTM 8(GR3),FR20 | FR20→C(i) |
| 14 | | FSTM 8(GR3),FR21 | FR21→C(i+1) |
| 15 | | FSTM 8(GR3),FR22 | FR22→C(i+2) |
| 16 | | FSTM 8(GR3),FR23 | FR23→C(i+3) |
| 17 | | BCNT GR4,LOOP | RETURNS TO LOOP IF i<N/4 |

FIG. 12

| No. | RELATIVE ADDRESS | INSTRUCTION STRING | OPERATION |
|---|---|---|---|
| 1 | LOOP | GLDM 8(GR1),GR20 | L(i)→GR20 |
| 2 | | GLDM 8(GR1),GR21 | L(i+1)→GR21 |
| 3 | | GLDM 8(GR1),GR22 | L(i+2)→GR22 |
| 4 | | GLDM 8(GR1),GR23 | L(i+3)→GR23 |
| 5 | | FLDM 0(GR20),FR20 | B (Li(i)) →FR20 |
| 6 | | FLDM 0(GR21),FR21 | B (Li(i+1)) →FR21 |
| 7 | | FLDM 0(GR22),FR22 | B (Li(i+2)) →FR22 |
| 8 | | FLDM 0(GR23),FR23 | B (Li(i+3)) →FR23 |
| 9 | | FSTM 8(GR3),FR20 | FR20→A(i) |
| 10 | | FSTM 8(GR2),FR21 | FR21→A(i+1) |
| 11 | | FSTM 8(GR2),FR22 | FR22→A(i+2) |
| 12 | | FSTM 8(GR2),FR23 | FR23→A(i+3) |
| 13 | | BCNT GR4,LOOP | IF i<N/4, PROGRAM RETURNS TO LOOP. |

FIG. 13

| No. | RELATIVE ADDRESS | INSTRUCTION STRING | OPERATION |
|---|---|---|---|
| 1 | | FLDM 8(GR1),FR12 | A(1) ← PFR ⟨0.12⟩ |
| 2 | | FLDM 8(GR2),FR13 | B(1) ← PFR ⟨0.13⟩ |
| 3 | | FLDPRM 8(GR1),FR12 | A(2) ← PFR ⟨1.12⟩ |
| 4 | | FLDPRM 8(GR2),FR13 | B(2) ← PFR ⟨1.13⟩ |
| 5 | | FADD FR20,FR12,FR13 | PFR ⟨0.12⟩ (A(1)) <br> + 〃 ⟨0.13⟩ (B(1)) <br> → PFR ⟨0.20⟩ |
| 6 | | ADD GR6,GR5 | GR6+1→GR6 (=1) |
| 7 | | CFRWPS GR6 | w = 1 |
| 8 | LOOP | FLDPRM 8(GR1),FR12 | A(i+1) ← PFR ⟨w+1.12⟩ |
| 9 | | FLDPRM 8(GR2),FR13 | B(i+1) ← PFR ⟨w+1.13⟩ |
| 10 | | FADD FR20,FR12,FR13 | PFR ⟨w,12⟩ (A(i)) <br> + 〃 ⟨w,13⟩ (B(i)) <br> → PFR ⟨w,20⟩ |
| 11 | | FSTPOM 8(GR3),FR20 | PFR ⟨w-1,20⟩ → C(i-1) |
| 12 | | ADD GR6,GR5 | GR6+1→GR6 |
| 13 | | CFRWPS GR6 | w+1 → w |
| 14 | | BCNT GR4,LOOP | IF i <N-1, THEN RETURN TO LOOP. |
| 15 | | FADD FR20,FR12,FR13 | PFR ⟨w,12⟩ (A(N)) <br> + 〃 ⟨w,13⟩ (B(N)) <br> →PFR ⟨w,20⟩ |
| 16 | | FSTPOM 8(GR3),FR20 | PFR ⟨w-1,20⟩ → C(N-1) |
| 17 | | ADD GR6,GR5 | GR6+1 → GR6 |
| 18 | | CFRWPS GR6 | w+1 → w |
| 19 | | FSTPOM 8(GR3),FR20 | PFR ⟨w-1,20⟩ → C(N) |

PFR : PHYSICAL FLOATING POINT REGISTER

FIG. 14A

| No. | RELATIVE ADDRESS | INSTRUCTION STRING | OPERATION |
|---|---|---|---|
| 1 | LOOP | GLDM 8(GR1),GR20 | L(l)→GR<0,20> |
| 2 | | FLDM 0(GR20),FR20 | B(Li(1))→FR<0,20> |
| 3 | | ADD GR6,GR5 | GR6+1→GR6(=1) |
| 4 | | CFRWPS GR6 | w=1 |
| 5 | | CGRWPS GR6 | WG=1 |
| 6 | | GLDM 8(GR1),GR20 | L(2)→GR<1,20> |
| 7 | | FLDM 0(GR20),FR20 | B(Li(2))→FR<1,20> |
| 8 | | ADD GR6,GR5 | GR6+1→GR6(=2) |
| 9 | | CFRWPS GR6 | w=2 |
| 10 | | CGRWPS GR6 | WG=2 |
| 11 | | GLDM 8(GR1),GR20 | L(3)→GR<2,20> |
| 12 | | SUB GR6,GR5 | GR6−1→GR6(=1) |
| 13 | | CFRWPS GR6 | w=1 |
| 14 | | CGRWPS GR6 | WG=1 |
| 15 | LOOP | GLDLIM 8(GR2),GR20 | (GR1)→GR<WG+2,20>(=L(i+2)) |
| 16 | | FLDLI FR20 | (GR<WG+1,20>)→FR<w+1,20>(=B(Li(i+1))) |
| 17 | | FSTPOM 8(GR2),FR20 | FR<w−1,20>(=B(Li(i−1)))→MMA SPECIFIED BY GR2 (ADDRESS OF A (i+1)) |
| 18 | | ADD GR6,GR5 | GR6+1→GR6 |
| 19 | | CFRWPS GR6 | w+1→w |
| 20 | | CGRWPS GR6 | WG+1→WG |
| 21 | | BCNT GR4,LOOP | IF i<N−2, PROGRAM RETURNS LOOP. |
| 22 | | FLDLI FR20 | (GR<WG+1,20>)→FR<w+1,20>(=B(Li(N))) |
| 23 | | FSTPOM 8(GR2),FR20 | FR<w−1,20>(=B(Li(N−2)))→MMA SPECIFIED BY GR2 (ADDRESS OF A(N−2)) |
| 24 | | ADD GR6,GR5 | GR6+1→GR6 |

FIG. 14B

| No. | RELATIVE ADDRESS | INSTRUCTION STRING | OPERATION |
|---|---|---|---|
| 25 | LOOP | CFRWPS GR6 | w+1→w |
| 26 | | CGRWPS GR6 | WG+1→WG |
| 27 | | FSTPOM 8(GR2),FR20 | FR<w-1,20>(=B(Li(N-1)))→MMA SPECIFIED BY GR2 (ADDRESS OF A(N-1)) |
| 28 | | FSTM 8(GR2),FR20 | FR<w,20>(=B(Li(N)))→MMA SPECIFIED BY GR2 (ADDRESS OF A(N)) |

FIG. 15A

| No. | RELATIVE ADDRESS | INSTRUCTION STRING | OPERATION |
|---|---|---|---|
| 1 | LOOP | GLDM 8(GR1),GR20 | L(l)→GR<0,20> |
| 2 | | FLDM 8(GR2),FR20 | B(l)→FR<0,20> |
| 3 | | ADD GR6,GR5 | GR6+1→GR6 |
| 4 | | CFRWPS GR6 | w=1 |
| 5 | | CGRWPS GR6 | WG=1 |
| 6 | | GLDM 8(GR1),GR20 | L(2)→GR<1,20> |
| 7 | | FLDM 8(GR2),FR20 | B(2)→FR<1,20> |
| 8 | | ADD GR6,GR5 | GR6+1→GR6 |
| 9 | | CFRWPS GR6 | w=2 |
| 10 | | CGRWPS GR6 | WG=2 |
| 11 | | GLDM 8(GR1),GR20 | L(3)→GR<2,20> |
| 12 | | SUB GR6,GR5 | GR6-1→GR6 |
| 13 | | CFRWPS GR6 | w=1 |
| 14 | | CGRWPS GR6 | WG=1 |
| 15 | LOOP | GLDLIM 8(GR1),GR20 | (GR1)→GR<WG+2,20>(=L(i+2)) |
| 16 | | FLDPRM 8(GR2),FR20 | (GR2)→FR<w+1,20>(=B(i+1)) |
| 17 | | FSTLI FR20 | FR<w-1,20>(=B(i-1))→MMA SPECIFIED BY GR<WG-1,20> ( ADDRESS OF A (Li(i-1)) ) |
| 18 | | ADD GR6,GR5 | GR6+1→GR6 |
| 19 | | CFRWPS GR6 | w+1→w |
| 20 | | CGRWPS GR6 | WG+1→WG |
| 21 | | BCNT GR4,LOOP | IF i<N-2, PROGRAM RETURNS TO LOOP. |

FIG. 15B

| No. | RELATIVE ADDRESS | INSTRUCTION STRING | OPERATION |
|---|---|---|---|
| 22 | | FLDPRM 8(GR2),FR20 | B(N)→FR<w+1,20> |
| 23 | | FSTLI FR20 | FR<w-1,20>(=B(N-2))→MMA SPECIFIED BY GR <WG-1<20> (ADDRESS OF A (Li(N-2)) |
| 24 | | ADD GR6,GR5 | GR6+1→GR6 |
| 25 | | CFRWPS GR6 | w+1→w |
| 26 | | CGRWPS GR6 | WG+1→WG |
| 27 | | FSTLI FR20 | FR<w-1,20>(=B(N-1))→MMA SPECIFIED BY GR<WG-1,20> (ADDRESS OF A (Li(N-1))) |
| 28 | | FSTM 0(GR20),FR20 | FR<w,20>(=B(N))→MMA SPECIFIED BY GR<WG,20> (ADDRESS OF A (Li(N)) |

FIG. 16A

| No. | RELATIVE ADDRESS | INSTRUCTION STRING | OPERATION |
|---|---|---|---|
| 1 | | GLDM 8(GR1),GR20 | L(1)→GR<0,20> |
| 2 | | FLDM 0(GR20),FR20 | A(Li(1))→FR<0,20> |
| 3 | | FLDM 8(GR2),FR21 | B(1)→FR<0,20> |
| 4 | | FADD FR20,FR21 | FR<0,20>+FR<0,21>→FR<0,20>(=A(Li(1)+B(1)) |
| 5 | | ADD GR6,GR5 | GR6+1→GR6(=1) |
| 6 | | CFRWPS GR6 | w=1 |
| 7 | | CGRWPS GR6 | WG=1 |
| 8 | | GLDM 8(GR1),GR20 | L(2)→GR<1,20> |
| 9 | | FLDM 0(GR20),FR20 | A(Li(2))→FR<1,20> |
| 10 | | FLDM 8(GR2),FR21 | B(2)→FR<1,21> |
| 11 | | ADD GR6,GR5 | GR6+1→GR6(=2) |
| 12 | | CFRWPS GR6 | w=2 |
| 13 | | CGRWPS GR6 | WG=2 |
| 14 | | GLDM 8(GR1),GR20 | L(3)→GR<2,20> |
| 15 | | SUB GR6,GR5 | GR6-1→GR6(=1) |
| 16 | | CFRWPS GR6 | w=1 |
| 17 | | CGRWPS GR6 | WG=1 |
| 18 | LOOP | GLDLIM 8(GR1),GR20 | (GR1)→GR<WG+2,20>(=L(i+2)) |
| 19 | | FLDLI FR20 | (GR<WG+1,20>)→FR<w+1,20>(=A(Li(i+1))) |
| 20 | | FLDPRM 8(GR2),FR21 | (GR2)→FR<w+1,21>(=B(i+1)) |
| 21 | | FADD FR20,FR21 | FR<w,20>+FR<w,21>→FR<w, 20>(A(Li(i)+B(i)) |
| 22 | | FSTLI FR20 | FR<w-1,20>(A(Li(i-1))+B(i-1))→MMA SPECIFIED BY (GR<WG-1,20>) (ADDRESS OF A (Li(i-1)) |
| 23 | | ADD GR6,GR5 | GR6+1→GR6 |

FIG. 16B

| No. | RELATIVE ADDRESS | INSTRUCTION STRING | OPERATION |
|---|---|---|---|
| 24 | | CFRWPS GR6 | w+1→w |
| 25 | | CGRWPS GR6 | WG+1→WG |
| 26 | | BCNT GR4,LOOP | IF i<N-2, PROGRAM RETURNS TO LOOP. |
| 27 | | FLDLI FR20 | (GR<WG+1,20>)→FR<w+1,20>(=A(Li(N))) |
| 28 | | FLDPRM 8(GR2),FR21 | (GR2)→FR<w+1,21>(=B(N)) |
| 29 | | FADD FR20,FR21 | FR<w,20>+FR<w,21>→FR<w,20>(A(Li(N-1))+B(N-1)) |
| 30 | | FSTLI FR20 | FR<w-1,20>(A(Li(N-2))+B(N-2))→MMA SPECIFIED BY (GR<WG-1,20>) (ADDRESS OF A (Li( N -2 ))) |
| 31 | | ADD GR6,GR5 | GR6+1→GR6 |
| 32 | | CFRWPS GR6 | w+1→w |
| 33 | | CGRWPS GR6 | WG+1→WG |
| 34 | | FADD FR20,FR21 | FR<w,20>+FR<w,21>→FR<w,20>(A(Li(N))+B(N)) |
| 35 | | FSTLI FR20 | FR<w-1,20>(A(Li(N-1))+B(N-1))→MMA SPECIFIED BY (GR<WG-1,20>) (ADDRESS OF A (Li ( N - 1 ))) |
| 36 | | FSTM 0(GR20),FR20 | FR<w,20>(A(Li(N))+B(N))→ MMA SPECIFIED BY (GR<WG,20>) (ADDRESS OF A (Li(N))) |

DATA PROCESSOR WITH IMPROVED LOOP HANDLING UTILIZING IMPROVED REGISTER ALLOCATION

BACKGROUND OF THE INVENTION

Field of the Invention

The present invention relates to a data processing method and apparatus and more particularly to a technique whereby the data processor can access a greater number of registers than can be addressed by instructions. Specifically this invention relates to vector processing method and apparatus which practically prevents performance degradation caused by data transfer from the main memory during a so-called vector processing that processes a great deal of data continuously for which a cache is not so effective.

Description of the Related Art

A conventional technique that permits the data processor to access the greater number of registers than can be addressed by instructions is cited in the Japanese Patent Laid-Open No. 166649/1982. According to this method, a group of hardware registers greater in number than the general registers that can be addressed by programs are provided. When there are two or more load instructions for the same general register from different main memory addresses, the load instructions are retained in these hardware registers. When the number of general registers addressable by the program is 16, 16 hardware registers are provided for each general register. In other words, 256 hardware registers are prepared in total. A general register 0, for instance, is assigned hardware registers 0 to 15. When 16 load instructions specifying different main memory addresses are executed for the general register 0, the data of the 16 load instructions are held in the hardware register 0 to hardware register 15.

A memory architecture is provided to register the main memory addresses of the load instructions that were executed in the past and the hardware register numbers in which the loaded data were stored. When the main memory address of a load instruction issued by the program matches the main memory address registered in the memory, the program reads data from the corresponding hardware register, instead of from the main memory. This method reduces the number of times that the main memory is accessed and prevents performance degradation due to reference register conflicts between instructions.

One of the conventional techniques that allow the data processor to access a greater number of registers than can be addressed by instructions is described in a book "Computer Architecture: A Quantitative Approach", at pp. 450–454, by J. L. Hennessy and D. A. Patterson, published by Morgan Kaufmann Publishers, Inc. (1990). According to this method, a larger number of registers called "physical registers" than can be addressed by programs are provided and divided into a plurality of parts called windows. That is, each window consists of a plurality of physical registers.

For example, let us assume that the program numbers the registers as 1 to n and that there are n*m physical registers, numbered from 1 to n*m. If m windows are provided, numbered from 1 to m, a window 1 may be assigned physical registers 1 to n and a window 2 physical registers n+1 to 2n. It is general practice to provide physical registers common for all windows or those common for adjacent windows. For simplicity, however, the above example is described. Each window has registers used by one program. In other words, referencing registers that can be addressed by a program actually means referencing physical registers belonging to a certain window. In the preceding example, if a certain program is assigned a window 2 and the program specifies a register k, the physical register to be referenced is n+k.

This window is used in the following manner. Suppose that a certain program is assigned a window j. When that program calls other program, the called program is assigned a window j+1. If a certain program is allocated with a window j and the control returns from that program to the original program, the latter program to which the control has returned is assigned a window j−1. Using the registers in this way offers the following advantages. In a system that has only the number of registers that can be addressed by programs, data stored in the registers must be stored in the main memory each time a call for a program occurs, in order to save information present at time of the call. Further, each time the control returns to the calling program, the data saved in the main memory must be written into the register again to resume the execution of the program. In the system having the above-mentioned window architecture, programs assigned different windows reference different physical registers, so that it is not necessary to save data from register to the main memory and rewrite the data again from the main memory to the register, making the process faster.

However, in a system with the above window structure, a control is needed whereby when a program call is made by a program with the maximum window number, a window overflow interrupt occurs and when a program return is initiated from a program with the minimum window number, a window underflow interrupt is produced.

Scientific and engineering computations are mostly the vector calculation shown below.

$$C(i)=A(i)+B(i), i=1, \ldots, N \quad (1)$$

where A, B, C are vectors with the element number N.

Among important calculations in scientific and engineering computations is a list vector calculation, which is expressed in the following equations and mainly used for a sparse matrix calculation.

$$A(i)=B(Li(i)), i=1, N \quad (2)$$

$$A(Li(i))=B(i), i=1, N \quad (3)$$

$$A(Li(i))=A(Li(i))@B(i), i=1, N \quad (4)$$

where Li is called a list vector. Equation (2) is a source index type calculation, and A and Li are vectors with an element number N, equation (3) is a target index type calculation, and B and Li are vectors with an element number N, and equation (4) is a particle pusher type calculation, and B and Li are vectors with an element number N. In equation (3), @ represents calculation such as addition, subtraction, multiplication and division.

As can be seen from equation (2), the source index type calculation stores into an i-th element of the vector A an element of the vector B whose element number is an i-th element of the list vector. The equation (3) indicates that the target index type calculation stores an i-th element of the vector B into an element of the vector A whose element number is an i-th element of the list vector. The equation (4) indicates that the particle pusher calculation performs operation on an element of the vector A whose element number is an i-th element of the list vector and on an i-th element of the vector B and stores the calculation result into the element of the vector A whose element number is the i-th element of the list vector. That is, the equations (2), (3) and (4) are calculations that take an element number of a vector as an element of another vector (list vector). The equation (4) is used in a sparse matrix, particularly in the field of particle pusher and therefore is referred to as a particle pusher type calculation.

When the equation (1) is executed by a general computer, the program will be as shown in FIG. 7.

When the equation (2) is executed by a general computer, the program will be as shown in FIG. 8.

In the following explanation, the data widths of the general register and the floating point register are taken to be 8 bytes.

The function of each instruction in FIGS. 7 and 8 are described below.

GLDM a (GRm), GRn (Function) 8 bytes of data are read from the main memory address specified by the value of the general register m and stores the data in the general register n.

And then the value of the general register m is added with a.

FLDM a (GRm), FRn (Function) 8-byte data is read from the main memory address specified by the value of the general register m and stored in the floating point register n.

And then, the value of the general register m is added with a.

FADD FRj, FRm, FRn (Function) The value of the floating point register m and the value of the floating point register n are added up and then the result is stored in the floating point register j.

FADD FRm, FRn (Function) The value of the floating point register m and the value of the floating point register n are added up and then the result is stored in the floating point register m.

FSTM a (GRm), FRn (Function) The value (8 bytes) of the floating point register n is stored in the main memory address specified by the value of the general register m.

And then the value of the general register m is added with a.

BCNT GRm, t (Function) The value of the general register m is decremented by 1. If the result is not zero, the program branches to an address t. If the decremented result is zero, no branching is made.

Prior to execution of the program of FIG. 7, the vector A is assumed to be stored in a contiguous region in the main memory starting from address ad1. That is, the main memory address of A(1) is ad1 and that of A(2) is ad1+8. Likewise, the vector B is assumed to be stored in a contiguous region of the main memory starting from address ad2. The vector C is assumed to be stored in a contiguous region of the main memory starting from address ad3. It is also assumed that the general register 1 is preset with ad1, the general register 2 with ad2, the general register 3 with ad3, and the general register 4 with N.

As is seen from FIG. 7, the No. 1 and No. 2 FLDM instructions load A(i) and B(i) into the floating point registers 12, 13, add up the values of the two registers, stores the result in the floating point register 20, and then stores the content of the register into C(i).

That is, executing once the loop of five instructions produces a result for one element. By repeating this loop N times, the results for all elements can be obtained.

What matters here is the execution time of one loop. No. 1 and No. 2 FLDM instructions load the data from the main memory into the floating point registers 12, 13. When data exists in cache, the FLDM instruction is completed in a small number of cycles. But when data is not in the cache, it must be read out from the main memory, which is much slower than the cache, taking a significantly longer time than when the data exists in the cache. Next, No. 3 FADD instruction uses the values of the floating point registers 12, 13. Since the values of the floating point registers 12, 13 can only be determined after the two preceding FLDM instructions have been executed, i.e., after the data have been read out, the FADD instruction cannot be executed until then. Further, No. 4 FSTM instruction uses the value of the floating point register 20. The value of the floating point register 20, however, cannot be determined before the preceding FADD instruction is completed, so that the FSTM instruction cannot be executed until then. That is, two performance degrading factors—(1) data reading time and (2) conflict between registers prolong the execution time of the loop. Particularly the factor (1) constitutes a serious problem for a computation handling a great deal of data because a large amount of data cannot often be accommodated in the cache, resulting in a significant reduction in performance.

Prior to execution of the program of FIG. 8, the vector L is assumed to be stored in a contiguous region in the main memory starting from address ad1. That is, the main memory address of L(1) is ad1 and that of L(2) is ad1+8. Likewise, the vector A is assumed to be stored in a contiguous region of the main memory starting from address ad2. The vector B is assumed to be stored in a contiguous region of the main memory starting from address ad3. It is also assumed that the general register 1 is preset with ad1, the general register 2 with ad2, and the general register 4 with N. The vector L is a variation of the list vector Li as shown below.

$$L(i)=8*(Li(i)-1)+ad3 \qquad (5)$$

That is, L(i) contains the address of B(Li(i))). When expressing the equation (2) by using Li(i), the program becomes complex because it contains the operations that multiply (Li(i)−1) by 8 and add ad3 to the result. For simplicity, therefore, L(i) is introduced.

From FIG. 8, it is seen that No. 1GLDM instruction loads L(i) into the general register 20, No. 2 FLDM instruction loads B(Li(i)) from the main memory address specified by the general register into the floating point register 20, and No. 3 FSTM instruction stores the value of the floating point register into A(i). By executing the loop made up of four instructions once, it is possible to determine the result of one element. Executing this loop N times calculates the results for all elements.

When matters here is the execution time of one loop as in FIG. 7. No. 1GLDM instruction loads data from the main memory into the general register 20. No. 2 FLDM instruction uses the general register 20, so that it cannot initiate execution before the loading is completed. Further, since No. 2 FLDM instruction loads data from the main memory into the floating point register 20 and No. 3 FSTM instruction uses the floating point register 20, the instruction execution cannot be started before the data loading is completed. Similar to the case of FIG. 7, two performance degrading factors—(1) data reading time and (2) register conflict—extend the execution time of the loop.

Likewise when the equations (3) and (4) are executed by a general computer, the programs will be as shown in FIGS. 9 and 10. The same performance degrading factors extend the execution time of the loop. The description of the programs are omitted.

It is conceivable to use a loop unrolling method as a means for solving the problem of the two performance degrading factors—(1) data reading time and (2) register conflict—caused by the vector processing programs shown in FIGS. 7 to 10. With this loop unrolling method, a plurality of elements (=n) are processed in one loop. When compared with the conventional method whereby one element is processed in one loop, this loop unrolling method has 1/n the number of loops required by the conventional method. The principle of the loop unrolling method is described in the above-cited book "Computer Architecture: A Quantitative Approach", at pp. 314 to 318 by J. L. Hennessy and D. A. Patterson.

The present inventors applied the loop unrolling method to the above-described programs. Application of the loop unrolling method to these programs results in the programs shown in FIGS. 11 and 12. In both the programs, four elements are processed in one loop.

Prior to the execution of the program of FIG. 11, it is assumed that the general register 4 is preset with N/4. The other preset data is the same as when executing the program shown in FIG. 7. As seen from FIG. 11, executing once the loop consisting of 17 instructions determines the results of four elements and repeating this loop N/4 times produces the calculated result for all elements.

As shown in FIG. 11, for the i-th element, the load operation is performed by No. 1 and No. 2 FLDM instructions, the add operation is done by No. 9 FADD instruction, and the store operation is done by No. 13 FSTM instruction. Similarly, for the (i+1)-th element, the load operation is done by No. 3 and No. 4 FLDM instructions, the add operation is done by No. 10 FADD instruction, and he store operation is done by No. 14 FSTM instruction. Likewise, for the (i+2)-th element, the load operation is performed by No. 5 and No. 6 FLDM instructions, the add operation is performed by No. 11 FADD instruction, and the store operation is performed by No. 15 FSTM instruction. For the (i+3)-th element, the load operation is done by No. 7 and No. 8 FLDM instructions, the add operation is done by No. 12 FADD instruction, and the store operation is done by No. 16 FSTM instruction.

Therefore, unlike the instructions in FIG. 7, the series of operations—load, add and store—on a certain element is separated from other instructions on the instruction sequence, thereby reducing the effects of performance degradation caused by the (1) data reading time and (2) register conflict. For example, No. 1 and No. 2 FLDM instructions load A(i) and B(i) and the result of the load operation is used seven instructions later, so that as long as the data read time is within seven cycles, the No. 9 FADD instruction that uses the result of the load operation is not made to wait. Further, since the result of addition A(i)+B(i) performed by No. 9 FADD instruction is used four instructions later, No. 13 FSTM instruction is not made to wait if the addition time is less than four cycles.

Next the program shown in FIG. 12 will be described. Prior to the execution of the program of FIG. 12, it is assumed that the general register 4 is preset with N/4. The other preset data is the same as when executing the program shown in FIG. 8. As seen from FIG. 12, executing once the loop consisting of 13 instructions determines the results of four elements and repeating this loop N/4 times produces the calculated result for all elements.

As is seen from FIG. 12, for the i-th element, the load operation of L is performed by No. 1 GLDM instruction, the load operation of B(Li) is done by No. 5 FLDM instruction, and the store operation of B(Li) into A is done by No. 9 FSTM instruction. Similarly, for the (i+1)-th element, the load operation of L is performed by No. 2 GLDM instruction, the load operation of B(Li) is carried out by No. 6 FLDM instruction, and the store operation of B(Li) into A is done by No. 10 FSTM instruction. Likewise, for the (i+2)-th element, L is loaded by No. 3 GLDM instruction, B(Li) is loaded by No. 7 FLDM instruction, and B(Li) is stored into A by No. 11 FSTM instruction. For the (i+3)-th element, loading of 1 is done by No. 4 GLDM instruction, loading of B(Li) is done by No. 8 FLDM instruction, and storing of B(Li) into A is performed by No. 12 FSTM instruction.

Therefore, unlike the instructions in FIG. 8, the series of operations—loading of L element, loading of B(Li) element and storing of B(Li) element into A—on a certain element number is separated from other instructions on the instruction sequence, thereby reducing the effects of the two performance degradation factors—(1) data reading time and (2) register conflict. For example, No. 1 GLDM instruction loads L(i) and the result of the load operation is used four instructions later, so that as long as the data read time is within four cycles, the No. 5 FLDM instruction that uses the result of the load operation is not made to wait. Further, since the result of load operation B(Li(i)) performed by No. 5 FLDM instruction is used four instructions later, No. 9 FSTM instruction that uses the result of the load operation is not made to wait if the data read time is less than four cycles.

Although the detailed description of application of the loop unrolling method to the programs shown in FIGS. 9 and 10 will not be given, the result of the study by the present inventors shows the same effects as described above.

According to the study by the present inventors, it has been found that while the loop unrolling method improves the performance, it also has a disadvantage of requiring many registers. The program shown in FIG. 7 requires three floating point registers, whereas the program shown in FIG. 11 requires twelve floating point registers. The program shown in FIG. 8 requires one floating point register and one general register, whereas the program shown in FIG. 12 requires four floating point registers and four general registers. Likewise, the program shown in FIG. 9 requires one floating point register and one general register for vector data storage, whereas the program by the loop unrolling method requires four floating point registers and four general registers. Likewise, the program shown in FIG. 10 requires two floating point registers and one general register for vector data storage, whereas the program by the loop unrolling method requires eight floating point registers and four general registers. If the time it takes to read data or perform calculation increases, a greater number of elements must be processed in one loop, requiring a greater number of registers.

Generally, the registers are formed of active elements (i.e., not memory elements) and thus can have many read/write ports (data access ports) permitting a much faster operation than the memory device which can only perform one data read/write operation in one operating cycle. Hence, it is essential to have registers with sufficient capacity to increase the operation speed. Despite this fact, only a small number of registers have conventionally been employed because the cost per bit is high and there is the following limitation on the field length of the register number in the instruction format. The cost problem is being alleviated by the advancement of LSI, whereas the latter problem is still not solved.

The number of registers that can be addressed by the program is limited by architecture. For example, if the instruction word has five bits for the register specification field, the number of addressable registers is 32 (5th power of 2). Increasing the number of bits of the register specification field increases the number of registers that can be addressed by the program. But it changes the instruction format, requiring modification of the existing program, which is unrealistic. It is therefore necessary to provide a method that allows the data processor to access a greater number of registers than can be addressed by instructions, without changing the architecture of the data processor.

With the first method described the Japanese Patent Laid-Open No. 166649/1982, when a new load instruction is issued for the main memory address for which a load instruction was executed in the past, the operation becomes faster. However, since the vector calculation like the equation (1), (2), (3), and (4) mostly makes the load request for one main memory address only once as with the programs of FIGS. 7 to 10, the operation speed is not increased by the conventional technique.

In the second register/window prior art, the registers that one program can use are those physical registers belonging to one window and its number is equal to the number of program-addressable registers. This means that the calculation performed by one program cannot be made faster. That is, the window architecture mentioned earlier can increase the processing speed only when a program call and return occurs. Where the processing is complete with one program as in the vector calculation of equation (1), (2), (3) and (4), a speed increase cannot be obtained.

SUMMARY OF THE INVENTION

It is an object of the present invention to provide a data processing method and data processor capable of accessing registers greater in number than registers accessible by instructions, without changing the architecture of the data processor.

It is another object of the present invention to provide a vector processing method and vector processor capable of performing a vector calculation of a large number of data without performance degradation due to time required for data transfer to and from a main memory.

It is a further object of the present invention to provide a vector processing method and vector processor capable of performing a list vector calculation for scientific and engineering computations.

In order to achieve the above objects of the present invention, a plurality of physical registers greater in number than can be addressed by program instructions are provided. The physical registers are divided into a plurality of partial groups (hereinafter referred to as windows). Each of the physical registers is specified by a physical register number determined by a combination of the number of the window and a register number (hereinafter referred to as a logical register number) in an instruction. The logical register number is converted into the physical register number by using the window number. In executing a calculation program having repetitive loops of an instruction sequence, the window is changed for each loop. An element to be calculated at the i-th loop is loaded at the loop before the i-th loop (hereinafter referred to as a preloop), and the result of the calculation at the i-th loop is stored at the loop after the i-th loop (hereinafter referred to as a postloop).

According to one aspect of the present invention achieving the above objects, the data processor comprises a plurality of physical registers greater in number than can be addressed by program instructions, the physical registers being divided into a plurality of windows and each of the physical registers being specified by a physical register number determined by a combination of a window number and a logical register number, a current window pointer register for storing a window pointer indicating the window number, and conversion means for converting the logical register number representing the register number in a program instruction into the physical register number by using the current window pointer.

Preferably, the data processor further comprises current window pointer valid indicating means for indicating that the current window pointer stored in the current window pointer register is valid.

According to another aspect of the present invention, the data processor comprises a plurality of physical floating point registers greater in number than floating point registers addressable by program instructions, the physical floating point registers being divided into a plurality of windows and each of the physical floating point registers being specified by a physical floating point register number determined by a combination of the window number and a floating point register number (hereinafter called a logical floating point register number) in an instruction, a current floating point window pointer register for storing a current floating point window pointer indicating the window number, a current floating point window pointer valid register for storing a value representing that the current floating point window pointer is valid, and a conversion circuit for converting the logical floating point register number into the physical floating point register number in a program instruction by using the current floating point window pointer.

For the processing operation by the data processor, there are provided:

a current floating point window pointer change instruction for changing the current floating point window pointer;

a floating point register preload instruction for converting the logical floating point register number into the physical floating point register number by using a current floating point window pointer having a different value from the current floating point window pointer stored in the current floating point window pointer register, the different value being determined from said current floating point window pointer stored in the current floating window pointer register, and storing data in the physical floating point register specified by the converted physical floating point register number; and a floating point register poststore instruction for converting the logical floating point register number into the physical floating point register number by using a floating point window pointer having a different value from the floating point window pointer stored in the floating point window pointer register, the different value being determined from the floating point window pointer stored in the floating point window pointer register, and storing data in a main memory from the physical floating point register specified by the converted physical floating point register number.

According to a further aspect of the present invention achieving the above objects, the data processor comprises: a plurality of physical floating point registers greater in number than floating point registers addressable by program instructions, the floating point registers being divided into a plurality of windows and each of the physical floating point registers being specified by a physical floating point register number determined by a combination of the window and the logical floating point register number;

a current floating point window pointer register for storing a current floating point window pointer to be used for converting the logical floating point register number indicating the floating point register number in a program instruction;

a first conversion circuit for converting the logical floating point register number into the physical floating point register number by using the current floating point window pointer;

a plurality of physical general registers greater in number than floating point registers addressable by instructions and greater in number than general registers addressable by instructions;

a current general window pointer register for storing a current general floating point register to be used for converting one of the logical floating point register number and a general register number in a program instruction;

a second conversion circuit for converting one of the logical floating point register number and logical general register number into the physical general register number by using the current general floating point window pointer; and a current general window pointer valid register for storing a value representing that the current general window pointer is valid.

For the processing operation by the data processor, there are provided at least:

a current floating point window pointer change instruction for changing the current floating point window pointer;

a current general window pointer change instruction for changing the current floating point window pointer;

a floating point register preload instruction for reading data from a main memory at a main memory address stored in the physical general register specified by converting the logical general register number into the physical general register number by using the current general window pointer, converting the logical floating point register number into the physical floating point register number by using a current floating point window pointer having a different value from the current floating point window pointer stored in the current floating point window pointer register, the different value being determined from the current floating point window pointer stored in the current floating window pointer register, and storing the data in the physical floating point register specified by the converted physical floating point register number; and a floating point register poststore instruction for reading data from the physical floating point register specified by the physical floating point register number converted from the logical floating point register number by using a floating point window pointer having a different value from the floating point window pointer stored in the floating point window pointer register, the different value being determined from the floating point window pointer stored in the floating point window pointer register, and for storing the data into the main memory at a main memory address stored in the physical general register specified by converting the logical general register number in the physical general register number by using the current general window pointer.

There are further provided:

a floating point register list load instruction for reading data from the main memory at a main memory address stored in the physical general register specified by converting the logical floating point register number by using a current general window pointer having a different value from the current general window pointer stored in the current general window pointer register, the different value being determined from the current general window pointer stored in the current general window pointer register, and storing the data in the physical floating point register specified by converting the logical floating point register number by using a current floating point window pointer having a different value from the current floating point window pointer stored in the current floating point window pointer register, the different value being determined from the current floating point window pointer stored in the current floating point window pointer register;

a general register restore load instruction for reading data from the main memory at a main memory address determined from information stored in the physical general register specified by converting a first logical general register number by using the current general window pointer, and storing the data in the physical general register specified by converting a second logical general register number by using a current general window pointer having a different value from the current general window pointer stored in the current general window pointer register, the different value being determined from the current general window pointer stored in the current general window pointer register; and a floating point register list store instruction for reading data from the physical floating point register specified by converting the logical floating point register number by using a current floating point window pointer having a different value from the current floating point window pointer stored in the current floating point window pointer register, the different value being determined from the current floating point window pointer stored in the current floating window pointer register, and storing the data in the main memory at a main memory address stored in the physical general register specified by converting said logical floating point register number by using a current general window pointer having a different value from the current general window pointer stored in the current general window pointer register, the different value being determined from the current general window pointer stored in the current general window pointer register.

The "register number in the instruction" mentioned in the above description of the floating point register list load instruction means a logical floating point register number or a logical general register number. In the embodiments later described represents the logical floating point register number. In the above description of the general register list load instruction, the operation that "determines a main memory address from information contained in a physical general register" takes the information contained in the physical general register as the main memory address in the embodiments. In the above description of the floating point register list store instruction, the "register number in the instruction" means a logical floating point register number or a logical general register number. In the embodiments later described it represents the logical floating point register number.

All the instructions that reference the floating point registers—except for the floating point register preload instruction, the floating point register poststore instruction, the floating point register list load instruction, the general register list load instruction, and the floating point register list store instruction—convert the logical floating point register number into the physical floating point register number by using the current floating point window pointer if the value of the current window pointer valid register is 1 so that referencing the floating point register references the corresponding physical floating point register number. If the value of the current window pointer valid register is 0, the logical floating point register number is equal to the physical floating point register number.

All the instructions that reference the general registers—except for the floating point register preload instruction, the floating point register poststore instruction, the floating point register list load instruction, the general register list load instruction, and the floating point register list store instruction—convert the logical general register number into the physical general register number by using the current general window pointer if the value of the current window pointer valid register is 1 so that referencing the general register references the corresponding physical general register number. If the value of the current window pointer valid register is 0, the logical general register number is equal to the physical general register number.

The floating point register preload instruction, the floating point register poststore instruction, the floating point register list load instruction, the general register list load instruction, and the floating point register list store instruction perform conversion from the logical floating point register number into the physical floating point register number, from the logical floating point register number into the physical general register number, and from the logical general register number into the physical general register number, aforementioned instruction specification, when the value of the current window pointer valid register is 1, and then reference the physical floating point register or physical general register specified by the register number obtained as a result of conversion. When the value of the current window pointer valid register is 0, the logical floating point register number in the instruction specification regarding the conversion from the logical floating point register number into the physical floating is equal to the physical floating point register number to be referenced; as to the conversion from the logical floating point register number into the physical general register number, the logical floating point register number is equal to the physical general register number to be referenced; and in the conversion from the logical general register number into the physical general register number, the logical general register number is equal to the physical general register number to be referenced.

The above-described main memory data means the data stored in the main memory, including data stored in the cache. Such main memory data includes vector data.

BRIEF DESCRIPTION OF THE DRAWINGS

FIG. 1 is an explanatory diagram showing an embodiment for converting a logical floating point register number into a physical floating point register number according to the invention;

FIG. 2 is an explanatory diagram showing an embodiment for converting a logical floating point register number or a logical general register number into a physical general register number according to the invention;

FIG. 3 is a block diagram showing an embodiment of a data processor executing instructions shown in FIGS. 4A to 4D;

FIGS. 4A, 4B, 4C and 4D show examples of the formats of a current floating point window pointer change instruction, a floating point register preload instruction, an extended floating point register preload instruction, and a floating point register poststore instruction, respectively;

FIGS. 6A, 6B, 6C, 6D, 6E, 6F, 6G and 6H show examples of the formats of a current floating point window pointer change instruction, a current general window pointer change instruction, a floating point register preload instruction, an extended floating point register preload instruction, a floating point register poststore instruction, a floating point register list load instruction, a general register list load instruction, and a floating point register list store instruction, respectively;

FIG. 7 shows an example of a program for vector calculation, part of scientific and engineering computation, performed in general purpose computers;

FIG. 8 shows an example of a program for source index type list vector calculation, part of scientific and engineering computation, performed in general purpose computers;

FIG. 9 shows an example of a program for target index type list vector calculation, part of scientific and engineering computation, performed in general purpose computers;

FIG. 10 shows an example of a program for particle pusher type list vector calculation, part of scientific and engineering computation, performed in general purpose computers;

FIG. 11 shows a program of FIG. 7 rewritten by the loop unrolling method;

FIG. 12 shows a program of FIG. 8 rewritten by the loop unrolling method;

FIG. 13 shows an example of a program for vector calculation according to an embodiment of the present invention;

FIGS. 14A and 14B show an example of a program for source index type list vector calculation according to an embodiment of the present invention;

FIGS. 15A and 15B show an example of a program for target index type list vector calculation according to an embodiment of the present invention; and FIGS. 16A and 16B show an example of a program for particle pusher type list vector calculation according to an embodiment of the present invention.

DESCRIPTION OF THE PREFERRED EMBODIMENTS

Figure 5:
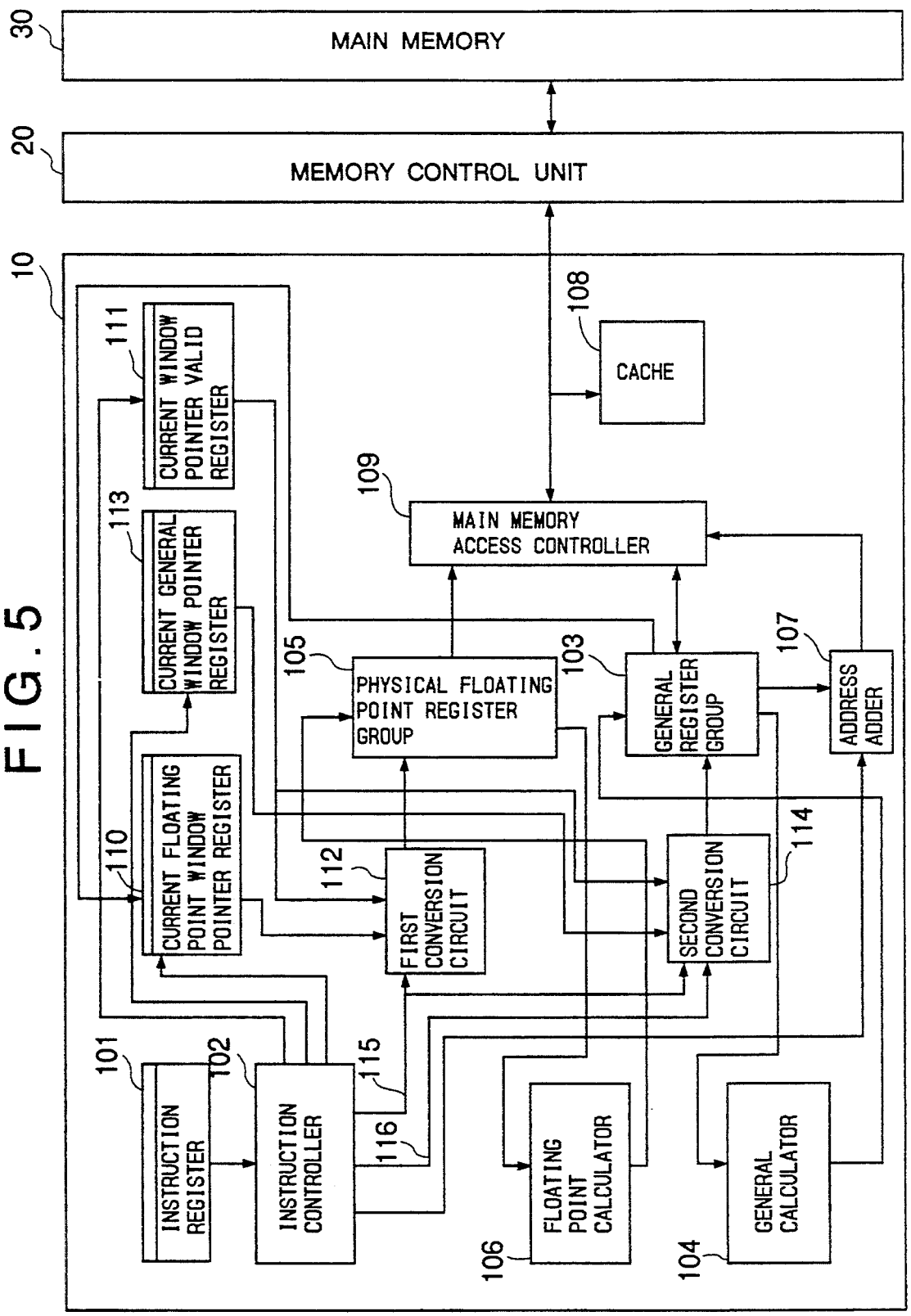
FIG. 5 is a block diagram showing an embodiment of a data processor executing instructions shown in FIGS. 6A to 6H.

Preferred embodiments of the present invention will now be described with reference to the accompanying drawings.

An embodiment of the conversion from a logical floating point register number into a physical floating point register number will be described with reference to FIG. 1. In this embodiment, a window of this embodiment defines the range of a physical floating point register number which a logical floating point register number designates.

In this embodiment shown in FIG. 1, there are 32 logical floating point registers, whose register numbers are specified as 0 to 31. 88 physical floating point registers are assigned register numbers from 0 to 87. Four windows are provided, w0 to w3, which are specified by the current floating point window pointer 0 to 3.

Let w stand for the current floating point window pointer and r for the logical floating point register number. The physical floating point register number is determined from w and r and represented as $<w, r>$. w is increased or reduced by instructions, modulo 4. When, for example, w=3, the value w+1 is 0.

In the embodiment shown in FIG. 1, the following conversion is done from the logical floating point register number to the physical floating point register number.

1. When $0 \leq r \leq 7$: $<w, r> = r$ irrespective of $w$     (6)
2. When $8 \leq r \leq 31$: $<0, r> = r$     (7)
                       $<1, r> = r + 20$     (8)
                       $<2, r> = r + 40$     (9)
                       $<3, r> = r + 60$ $(8 \leq r \leq 27)$
                                  $r - 20$ $(28 \leq r \leq 31)$     (10)

Another embodiment of the conversion from a logical register number into a physical register number will be described with reference to FIG. 2. In this embodiment, a window of this embodiment defines the range of a physical general register number which a logical floating point register number or a logical general register number designates.

In this embodiment shown in FIG. 2, there are 32 logical floating point registers, whose register numbers are specified as 0 to 31. 88 physical general registers are assigned register numbers from 0 to 87. Four windows are provided, w0 to w3, which are specified by the current general window pointer 0 to 3.

Let wG stand for the current general window pointer and r for the logical general, or floating point, register number. The physical general register number is determined from wG and r and represented as $<wG, r>$.

wG is increased or reduced by instructions, modulo 4. When, for example, wG=3, the value wG+1 is 0.

In the embodiment shown in FIG. 2, the following conversion is done from the logical floating point register number or logical general register number into the physical general register number.

1. When $0 \leq r \leq 7$: $<wG, r> = r$ irrespective of $wG$     (11)
2. When $8 \leq r \leq 31$: $<0, r> = r$     (12)
                       $<1, r> = r + 20$     (13)
                       $<2, r> = r + 40$     (14)
                       $<3, r> = r + 60$ $(8 \leq r \leq 27)$
                                  $r - 20$ $(28 \leq r \leq 31)$     (15)

The above conversion method expressed by equations (6) to (15) has the following two features.

1. 0th to 7th physical general registers and physical floating point registers are used commonly for all windows. These registers as a global register hold data common for all the calculation loops that use respective windows.

2. As to the physical floating point registers (FIG. 1), the logical floating point register numbers 28 to 31 in each window represent the physical floating point registers that are identical with the logical floating point register number 8 to 11 in a window whose window pointer is one larger.

As to the physical general register (FIG. 2), when a logical general register number is converted into a physical general register number, the logical general register numbers 28 to 31 in each window represent the physical general registers that are identical with the logical general register numbers 8 to 11 in a window whose window pointer is one larger. When a logical floating point register number is converted into a physical general register number, the logical floating point register numbers 28 to 31 in each window represent the physical general registers that are identical with the logical floating point register numbers 8 to 11 in a window whose window pointer is one larger.

These registers are used as overlap registers for data transfer between calculation loops that use adjacent windows.

The instruction mnemonics and functions of the newly added instructions mentioned above are defined as follows. An extended floating point register preload instruction shown below, though not mentioned in the foregoing, is newly added as an instruction which has an extended function of the floating point register preload instruction.

1. Current floating point window pointer change instructions: (Instruction mnemonic) CFRWPS GRm (Function) Sets the value of general register m into the current floating point window pointer.

2. Current general window pointer change instruction: (Instruction mnemonic) CGRWPS GRm (Function) Sets the value of general register m into the current general window pointer.

3. Floating point register preload instruction: (Instruction mnemonic) FLDPRM a (GRm), FRn (Function) Reads 8-byte data from the main memory address specified by the value of the general register m and stores it in the floating point register n. At this time, the conversion from a logical floating point register number into a physical floating point register number is done by taking (current floating point window pointer +1) as a new current floating point window pointer. A logical general register number is converted into a physical general register number by using a current general window pointer.

Then, the value of the general register m is added with a. At this time, conversion from the logical general register number into the physical general register number is done by using the current general window pointer.

4. Extended floating point register preload instruction: (Instruction mnemonic) FLDPRE a (GRm), FRn (Function) Reads 8-byte data from the main memory address specified by the value of the general register m and stores it in the floating point register n. The conversion from a logical floating point register number into a physical floating point register number is done by taking (current floating point window pointer +2) as a new current floating point window pointer. A logical general register number is converted into a physical general register number by using a current general window pointer.

Then, the value of the general register m is added with a. At this time, conversion from the logical general register number into the physical general register number is done by using the current general window pointer.

5. Floating point register poststore instruction: (Instruction mnemonic) FSTPOM a (GRm), FRn (Function) Stores the value (8 bytes) of the floating point register n in the main memory address specified by the value of the general register m. At this time, the conversion from the logical floating point register number into the physical floating point register number is done by taking (current floating point window pointer −1) as a new current floating point window pointer. A logical general register number is converted into a physical general register number by using a current general window pointer.

Then, the value of the general register m is added with a. At this time, conversion from the logical general register number into the physical general register number is done by using the current general window pointer.

6. Floating point register list load instruction: (Instruction mnemonic) FLDLI, FRn (Function) Reads 8-byte data from the main memory address specified by the value of the general register n and stores it in the floating point register n. At this time, for a logical floating point register number n, conversion from the logical floating point register number into the physical floating point register number is performed by taking (current floating point window pointer +1) as a new current floating point window pointer. For a logical floating point register number n, conversion from the logical floating point register number into the physical general register number by taking (current general window pointer +1) as a new current general window pointer.

7. General register list load instruction: (Instruction mnemonic) GLDLIM a (GRm), GRn (Function) Reads 8-byte data from the main memory address specified by the value of the general register m and stores it in the general register n. At this time, for a logical general register number n, conversion from the logical general register number into the physical general register number is performed by taking (current general window pointer +2) as a new current general window pointer. For a general register m, conversion from the logical general register number into the physical general register number is performed by using the current general window pointer.

Then, the value of the general register m is added with a. At this time, conversion from the logical general register number into the physical general register number is done by using the current general register window pointer.

8. Floating point register list store instruction: (Instruction mnemonic) FSTLI, FRn (Function) Stores the value (8 bytes) of the floating point register n into the main memory address specified by the value of the general register n. At this time, for a logical floating point register number n, conversion from the logical floating point register number into the physical floating point register number is performed by taking (current floating point window pointer −1) as a new current floating point window pointer. For a logical floating point register number n, conversion from the logical floating point register number into the physical general register number by taking (current general window pointer −1) as a new current general window pointer.

In general floating point instructions (those using the floating point registers, except for instructions 3 to 8), the current floating point window pointer is used in converting the logical floating point register number into the physical floating point register number. With general instructions (those using the general registers, except for instructions 3 to 8), the current general window pointer is used in converting the logical general register number into the physical general register number.

In all the instructions described above, the physical floating point register or physical general register are referenced by using the physical floating point register number or physical general register number, generated from the current floating point window pointer or current general window pointer, and the logical floating point register number or logical general register number in an instruction. However, an instruction for directly specifying the physical floating point register number or physical general register number, i.e., an instruction having a wider register number field than other instructions, may also be used.

Using the above new mnemonics and functions of instructions in the equation (1) results in a program shown in FIG. 13. This program will be described with reference to FIG. 3.

Before executing the program of FIG. 13, it is assumed that the general register 4 is preset with N−2, general register 5 with 1, general register 6 with 0, and the current floating point register window pointer with 0.

The other settings are the same as those shown in the program of FIG. 7.

FIG. 13 includes an ADD instruction, which is not described in the above. The function of this instruction is described below.

ADD GRj, GRm (Function) Adds the value of the general register j and the value of the general register m and stores the result in the general register j.

FIG. 13 will be explained below. No. 1 FLDM instruction performs conversion from the logical floating point register number to the physical floating point register number by the current floating point register window pointer and stores A(1) in the physical floating point register <0, 12>. Likewise, No. 2 FLDM instruction stores B(1) in the physical floating point register <0, 13>.

No. 3 FLDPRM instruction performs conversion from the logical floating point register number to the physical floating point register number by using the value of (current floating point register window pointer +1) and stores A(2) in the physical floating point register <1, 12>. In the same way, No. 4 FLDPRM instruction stores B(2) in the physical floating point register <1, 13>.

No. 5 FADD instruction performs conversion from the logical floating point register number to the physical floating point register number by using the current floating point register window pointer, and adds up the values of the physical floating point registers <0, 12> and <0, 13>, storing the result in the physical floating point register <0, 20>. Since the No. 1 and No. 2 FLDM instructions store A(1) and B(1) in the physical floating point registers <0, 12> and <0, 13>, respectively, A(1)+B(1) is saved in the physical floating point register <0, 20>. No. 5 ADD instruction and No. 6 CFRWPS instruction increment the current floating point register window pointer by +1 to 1. No. 8 FLDPRM instruction to No. 14 BCNT instruction form a loop and repetitively executed N−2 times.

Let w stand for the value of the current floating point register window pointer in the loop. Let us consider the loop executed the (i−1)th time. It is seen from the values of the general registers 1 and 2 that the data added up by No. 10 FADD instruction are A(i) and B(i) and that what is loaded by the No. 8 and No. 9 FLDPRM instructions into the physical floating point registers <w+1,12> and <w+1,13> is A(i+1) and B(i+1). As is seen from the value of the general register 3, No. 11 FSTPOM instruction stores the value of the physical floating point register <w−1,20> in the main memory address C(i−1). No. 12 ADD instruction and No. 13 CRFWPS instruction increments the current floating point register window pointer w by +1 and the program returns to the start of the loop. That is, in one loop, data A(i+1), B(i+1) to be added up in the next loop are stored in the physical floating point registers <w+1,12> and <w+1,13>. A(i) and B(i) stored in the physical floating point registers <w,12> and <w,13> in the preceding loop are added up and the result stored in the physical floating point register <w,20>. A(i−1)+B(i−1) stored in the physical floating point register <w−1,20> in the preceding loop is stored in the main memory address C(i−1).

No. 15 through No. 19 instructions after leaving the loop call for processing on the unprocessed elements. No. 15 FADD instruction executes A(N)+B(N), and No. 16 and No. 19 FSTPOM instructions store A(N−1)+B(N−1), A(N)+B(N) in the main memory, respectively.

As is seen from the processing in the loop, No. 8 and No. 9 FLDPRM instructions specify the logical floating point registers 12, 13 and the succeeding No. 10 FADD instruction, though it uses the same logical floating point registers 12, 13, accesses different physical floating point registers. No. 10 FADD instruction stores the addition result in the logical floating point register 20 and the next FSTPOM instruction, though it uses the same logical floating point register 20, accesses different physical floating point registers. Hence, the phenomena that occurred with the program of FIG. 7—such as holding the execution of succeeding instructions until the data is read out or the preceding calculation is completed—do not happen. In other words, the data reading and calculation need only be completed before the next loop is initiated, allowing the program to be executed at high speed. Further, only three logical floating point registers are specified by the program as opposed to many floating point registers required by the program of FIG. 11.

When compared with the programs of FIGS. 7 and 11, the program of FIG. 13 has a greater overhead because it has an additional processing of updating the current floating point register window pointer that is not included in the programs of FIGS. 7 and 11. For example, while the program loop of FIG. 7 is formed of five instructions, the program loop of FIG. 13 consists of seven instructions. It is noted, however, that the overhead caused by the holding of execution of the succeeding instructions until the data is read out or the calculation is completed, as found in the program of FIG. 7, is much larger. The loop unrolling method of the program in FIG. 11 cannot be realized when the registers that can be specified by the program are all used up.

In the vector calculation as in scientific and engineering computation which mainly repeats executing the loop of instruction strings, this invention changes the current floating point register window pointer for each loop, i.e., changes the window to be used. The i-th element is processed by loading the i-th element of the operand vector by the floating point register preload instruction in the (i−1)th loop; by performing calculation in the i-th loop; and by storing the result of calculation into the i-th element of the result storage vector by the floating point register poststore instruction performed in the (i+1)th loop. This processing increases the distance on the instruction string between load, calculate and store instructions on one data, eliminating performance degradation due to prolonged data read time and calculation execution time and hence increasing the operation speed.

The effect of increasing the operation speed will be described quantitatively.

Assume that the time required for reading data during a load operation is four cycles and the time required for an addition is four cycles. As described above, in the program of FIG. 7, No. 3 FADD instruction cannot be executed until the data read by No. 1 and No. 2 FLDM instructions have been stored in FR12 and FR13. No. 4 FSTM instruction cannot be executed until the addition result by No. 3 FADD instruction has been stored in FR20. Namely, one loop requires 11 cycles=5+3+3=(the number of instructions)+(read data wait cycle number −1) +(addition cycle number −1). The "−1" in the second and third terms results from that one cycle in the read data wait cycle number and the addition cycle number is included in the first term. The processing speed is therefore one element/11 cycle=0.09 element.

As described previously, in the program shown in FIG. 11, the time required for the data read and addition during a load operation does not appear so that one loop requires cycles corresponding to the number of instructions. In this case, one loop requires 17 cycles and processes 4 elements. Therefore, the processing speed is 4 elements/17 cycles=0.24 element/cycle.

According to the present invention, as shown in FIG. 13, the time required for the data read and addition during a load operation does not appear so that one loop requires cycles corresponding to the number of instructions. In this case, one loop requires 7 cycles and processes one element. Therefore, the processing speed is one element/7 cycles=0.14 element/cycle.

From the comparison of FIGS. 7, 11, and 13, it can be seen that the processing speed becomes faster in the order of FIG. 11, 13, and 7.

The program shown in FIG. 11 uses a number of registers to be designated by instructions, posing a fatal problem that usable application programs are limited. Namely, the number of floating point registers to be designated by instructions in the program shown in FIG. 7 is three, the number of floating point registers to be designated by instructions in the program shown in FIG. 11 is twelve, and the number of floating point registers to be designated by instructions in the program shown in FIG. 13 is three.

The programs shown in FIGS. 7 and 13 can be executed by a data processor having 3 bits of a floating point register specification field, but the program shown in FIG. 11 cannot be executed.

The data processing method provides therefore a method of increasing the operation speed by not using the time required for the data read and calculation, without changing the architecture of the data processor.

Next, an embodiment of a data processor of the present invention for executing the above-described data processing method will be described with reference to the accompanying drawings.

FIG. 3 shows the data processor of the embodiment. The data processor includes: an instruction processing unit 10 for issuing and executing instructions; a main memory 30 for storing instructions and data executed by the instruction processing unit; and a memory control unit 20 for controlling data transfer between the instruction processing unit and the main memory.

The instruction processing unit 10 includes: an instruction register 101 for holding the instruction to be executed; an instruction controller 102 for reading the contents of the instruction register 101 and controlling the execution of instructions; a general register group 103 for holding data necessary for general calculation and address calculation; a general calculator 104 for executing general calculation specified by the instruction; a physical floating point register group 105 for holding data necessary for floating point calculation; a floating point calculator 106 for executing floating point calculation specified by the instruction; an address adder 107 for calculating the main memory address containing data to be accessed; a cache 108 for holding main memory data read out by the memory control unit 20; a main memory access controller 109 for performing control such as reading main memory data from the memory control unit 20 according to the result of search in the cache 108; a current floating point window pointer register 110 for storing a current floating point register window pointer; a current floating point window pointer valid register 111 for indicating that the current floating point register window pointer is valid; and a conversion logic 112 for converting the logical floating point register number specified by the instruction into a physical floating point register number according to equations (6) to (10).

The data processor, as shown in FIGS. 4A-4D, is added with four new instructions. These are shown in FIG. 4A as a current floating point window pointer change instruction, in FIG. 4B as a floating point register preload instruction, in FIG. 4C as an extended floating point register preload instruction, and in FIG. 4D as a floating point register poststore instruction. Of the above instructions, the instruction mnemonics and functions of the instructions have been described already.

In FIG. 4A, the instruction code represents the current floating point window pointer change instruction. The general register number specifies the general register that contains a value of the current floating point register window pointer to be set. The floating point register preload instruction is one to store the main memory data into a floating point register belonging to the window of (current floating point register window pointer +1).

In FIG. 4B, the instruction code represents the floating point register preload instruction. The floating point register number represents a logical floating point register number (r) where the main memory data is stored. The corresponding physical floating point register number is $<w+1,r>$ where w is a current floating point register window pointer. The value of the general register is the main memory address from which data is to be read out. After data is read out, the value to be added to the general register is an increment value. The extended floating point register preload instruction is one to store the main memory data into a floating point register belonging to a window of (current floating point register window pointer +2).

In FIG. 4C, the instruction code represents the extended floating point register preload instruction. The floating point register number represents a logical floating point register number (r) where the main memory data is stored. The corresponding physical floating point register number is $<w++2,r>$ where w is a current floating point register window pointer. The value of the general register is the main memory address from which data is to be read out. After data is read out, the value to be added to the general register is an increment value.

The function of the extended floating point register preload instruction is simply an extension of the floating point register preload instruction and is self-evident from the above description. The extended floating point register preload instruction is used in the following case. In the embodiment shown in FIG. 13, the data read time is within eight cycles. The data read at No. 9 FLDPRM instruction during the (i−1)-th loop is stored in the physical floating point register $<w+1, 13>$ which is read by No. 10 FADD instruction during the i-th loop, within eight cycles after the execution of No. 9 instruction. Therefore, the execution of No. 10 instruction is not required to wait, and the instructions in the loop from No. 8 to No. 14 instruction can be executed one instruction per one cycle.

For example, assume that the data read time becomes long and exceeds eight cycles because of a slow memory element. In such a case, the data read by No. 9 FLDPRM instruction during the (i−1)-th loop is stored in the physical floating point register $<w+1, 13>$ which is read by No. 10 FADD instruction during the i-th loop, after more than nine cycles after the execution of No. 9 instruction. Therefore, the execution of No. 10 instruction is required to wait. Namely, the instructions within the loop from No. 8 to No. 14 instruction cannot be executed one instruction per one cycle pitch.

In such a case, as an alternative of the floating point register preload instruction, the extended floating point register preload instruction is used. The program is changed such that the time when the data read by the extended floating point register preload is stored in the floating point register, is delayed by two loops. Namely, although in the program shown in FIG. 13 the data read during the (i−1)-th loop is stored in the floating point register during the i-th loop, it becomes possible by using the extended floating point register preload instruction to store the data read during the (i−1)-th loop in the floating point register during the (i+1)-th loop. By changing the program correspondingly, the instruction within the loop can be executed one instruction per one cycle pitch, even in the case of a longer data read time.

In FIG. 4D, the instruction code represents the floating point register poststore instruction. The floating point register number represents a logical floating point register number (r) from which the data is read. The corresponding physical floating point register number is $<w-1,r>$ where w is a current floating point register window pointer. The value of the general register is the main memory address in which data is to be stored. After data is read out, the value to be added to the general register is an increment value.

The operation of these instructions is explained by referring to FIG. 3. First, let us explain about the current floating point register window pointer change instruction. When an instruction is taken into the instruction register 101, the instruction is decoded by the instruction controller 102. When the instruction is identified to be a current floating point register window pointer change instruction, the general register specified by the instruction is read from the general register group 103 and the value of that register is set in the current floating point window pointer register 110.

Next, the floating point register preload instruction is explained. When the instruction is taken into the instruction register 101, the instruction is decoded by the instruction controller 102. When the instruction is identified to be a floating point register preload instruction, the address adder 107 takes in the content of the general register specified by the instruction and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the floating point register 105. The physical floating point register number in which the data is stored is determined by the conversion circuit 112 as follows. The floating point register number specified by the instruction represents a logical floating point register number (r), and the physical floating point register number is $<w+1,r>$ where w is the value of the current floating point window pointer register 110. After the data transfer has started, the general calculator 104 adds an increment value to the value of the general register.

If the data is not present in the cache 108, it is conceivable that the data transferred from the main memory 30 is written in the floating point register 105 and in the cache 108. However, the write operation into the cache 108 requires two or more cycles in general. Therefore, there is a fear that the execution of the next instruction is stopped, being unable to ensure the processing speed of one instruction per one cycle. In view of this, in this embodiment, if the data is not present in the cache, the data transferred from the main memory 30 is not written in the cache 108 but is written only in the floating point register 105.

Next, we will explain about the extended floating point register preload instruction. When the instruction is taken into the instruction register 101, the instruction is decoded by the instruction controller 102. When the instruction is identified to be an extended floating point register preload instruction, the address adder 107 takes in the content of the general register specified by the instruction and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the floating point register 105. The physical floating point register number in which the data is stored is determined by the conversion circuit 112 as follows. The floating point register number specified by the instruction represents a logical floating point register number (r), and the physical floating point register number is $<w+2,r>$ where w is the value of the current floating point window pointer register 110. After the data transfer has started, the general calculator 104 adds an increment value to the value of the general register.

Next, the floating point register poststore instruction will be described. When the instruction is taken into the instruction register 101, the instruction is decoded by the instruction controller 102. When the instruction is identified to be a floating point register poststore instruction, the address adder 107 takes in the content of the general register specified by the instruction and puts it out as a main memory address in which to store data. The data is read from the floating point register 105. The physical floating point register number from which the data is read out is determined by the conversion circuit 112 as follows. The floating point register number specified by the instruction represents a logical floating point register number (r), and the physical floating point register number is $<w-1,r>$ where w is the value of the current floating point window pointer register 110. The main memory access controller 109 searches through the cache 108 according to the main memory address. If the cache has a copy of data which is stored in the main memory address, the controller 109 replaces that data with the read data. When the data is not found in the cache, nothing is done about the cache. The main memory access controller 109 stores the read data into the main memory address via the memory control unit 20. After the data transfer has started, the general calculator 104 adds an increment value to the value of the general register.

If a copy of the data stored in the main memory 30 is not present in the cache 108, it is conceivable that the data read from the floating point register 105 is stored in the main memory 30 at the corresponding address, and also in the cache 108. However, the write operation into the cache 108 requires two or more cycles in general. Therefore, there is a fear that the execution of the next instruction is stopped, being unable to ensure the processing speed of one instruction per one cycle. In view of this, in this embodiment, if a copy of the data stored in the main memory 30 is not present in the cache, the data read from the floating point register 105 is stored in the main memory 30 at the corresponding address, but is not written in the cache 108.

In general floating point instructions (calculate, load and store), the logical floating point register number r indicated in the instruction is converted by the conversion logic 112 into a physical floating point register number, which is given by <w,r> where w is the value of the current floating point window pointer register 110. Then, a reference is made to the floating point register represented by the physical floating point register number.

When the value of the current floating point window pointer valid register 111 is "1", the current floating point register window pointer is valid. That is, the conversion circuit 112 converts the logical register number into the physical register number. When the register 111 has a value "0", the logical register number-physical register number conversion is not performed, making the logical floating point register number specified by the instruction a physical floating point register number. Thus, the physical floating point register specified by this derived physical floating point register number is referenced. The current floating point window pointer valid register 111 may be assigned an idle bit of an existing register that stores control information of the data processing system and the validity bit may be set by using an existing instruction for storing a value in the register.

In the description of the above embodiment, one current floating point register window pointer register 111 is used. However, two such current floating point register window pointer registers may be used, one (referred to as register A) being used only by the floating point register preload instruction and the other (referred to as register B) being used by other instructions except the floating point register preload instruction, and the current floating point window pointer change instruction change both the two current floating point register window pointer registers at the same time. Such arrangement is effective for a longer memory read time as in the following.

For the floating point register preload instruction, the processing pitch of one instruction per one cycle can be ensured under the condition that the memory read time allows the data read by the i-th loop instruction to be stored in the floating point register before the calculation instruction starts at the (i+1)-th loop, as described previously.

For the extended floating point register preload instruction, the processing pitch of one instruction per one cycle can be ensured under the condition that the memory read time allows the data read by the i-th loop instruction to be stored in the floating point register before the calculation instruction starts at the (i+2)-th loop, as described previously.

If the memory read time is longer than the time required for the data read by the i-th loop instruction to be stored in the floating point register before the calculation instruction starts at the (i+2)-th loop, it is not possible to ensure the processing pitch of one instruction per one cycle. It is possible to use an instruction extended further from the above-described extended floating point register preload instruction, but an increase of the number of instructions is not desirable.

In this connection if the window pointer to be used by the floating point register preload instruction is different from other window pointers to be used by other instructions, it is possible to deal with a change in the memory read time without using the extended floating point register preload instruction.

For example, if the memory read time is within such a time period allowing the data read during the i-th loop to be stored in the floating point register before the calculation instruction starts at the (i+1)-th loop, it is possible to ensure the processing pitch of one instruction per one cycle by issuing the floating point register preload instruction and loading the data in the register of the window (w+1) while setting the register B to a value w and the register A to the value w during the i-th loop. If the memory read time is not shorter than such a time period allowing the data read during the i-th loop can be stored in the floating point register before the calculation instruction starts at the (i+2)-th loop but it is within such a time period allowing the data read during the i-th loop can be stored in the floating point register before the calculation instruction starts at the (i+3)-th loop, then it is possible to ensure the processing pitch of one instruction per one cycle by issuing the floating point register preload instruction and loading the data in the register of the window (w+3) while setting the register B to a value (w) and the register A to a value w+2) during the i-th loop.

At the end of a loop, the current floating point window pointer change instruction adds 1 to the two current floating point register window pointer registers at the same time, allowing the concurrent processing at the next loop.

Described above is the way the instructions-the current floating point window pointer change instruction, the floating point preload instruction, the extended floating point register preload instruction, the floating point register poststore instruction, and general floating point instructions under the control of the floating point window pointer-work.

With the above embodiment, the program shown in FIG. 13 can be implemented increasing the speed of the vector calculation. This has been described previously.

According to the method of this invention, the current floating point window pointer is changed to convert a floating point register number in an instruction into a different physical floating point register number, making it possible to access a greater number of physical registers than can be addressed by instructions, without changing the architecture of the data processor. This method realizes a program as shown in FIG. 13, preventing performance degradation which would otherwise be caused by the holding of instruction execution due to prolonged data reading or register conflicts. This in turn ensures a faster execution of programs.

As can be seen from the program of FIG. 13, vector calculation as in scientific and engineering computation which mainly repeats executing the loop of instruction strings performs processing as follows by allocating different windows to different loops. The i-th element is processed by loading the i-th element of the operand vector by the floating point preload instruction in the (i−1)th loop; by performing calculation in the i-th loop; and by storing the result of calculation into the i-th element of the result storage vector by the floating point poststore instruction performed in the (i+1)th loop. This processing increases the distance on the instruction string between load, calculate and store instructions on one data, eliminating performance degradation due to prolonged data read time and calculation execution time and increasing the operation speed.

Next, an embodiment of a data processor of the present invention for executing the above-described data processing method will be described with reference to the accompanying drawings.

Next, an embodiment of a data processing method and data processor applying the present invention to a list vector calculation will be described with reference to the accompanying drawings.

A program shown in FIGS. 14A and 14B is obtained when applying the present invention to the equation (2) of the source index type calculation.

Before executing the program of FIGS. 14A and 14B, the vectors L, A, and B are assumed to be stored in contiguous regions of the main memory starting from addresses ad1, ad2, and ad3. It is also assumed that the general register 1 is preset with ad1, the general register 2 with ad2, the general register 4 with $N-3$, the general register 5 with 1, the general register 6 with 0, the current floating point window pointer with 0, the current general window pointer with 0, and the current window pointer valid register with 1. The vector L is a variation of the list vector Li as shown in equation (5).

FIGS. 14A and 14B include the SUB instruction that is not described in the above. This function will be explained below.

SUB GRj, GRm (Function) Subtracts the value of the general register m from the value of the general register j and store the result into the general register j.

FIGS. 14A and 14B will be explained below. No. 1 GLDM instruction converts the logical general register number into the physical general register number by using the current general window pointer. Hence, L(1), i.e., "address of B(Li(1))" is stored in the physical general register $<0,20>$. No. 2 FLDM instruction converts the logical general register number into the physical general register number by using the current general window pointer and converts the logical floating point register number into the physical floating point register number by using the current floating point window pointer. Hence, data B(Li(1)) in the main memory address specified by L(1) contained in the physical general register $<0,20>$ is stored into the physical floating point register $<0,20>$.

No. 3 ADD instruction specifies the logical general register 6. Since, from equation (10), this register is a physical general register 6 (global register), the value of the physical general register 6 is set to 1. No. 4 CFRWPS instruction sets the value of the physical general register 6 into the current floating point window pointer, i.e., sets the window pointer to 1. Similarly, No. 5 CGRWPS instruction puts the value of the physical general register 6 into the current general window pointer, i.e., set the window pointer to 1.

No. 6 GLDM instruction performs conversion from the logical general register number into a physical general register number by using the current general window pointer. This causes L(2), i.e., the "address of B(Li(2))" to be stored in the physical floating point register $<1,20>$. No. 7 FLDM instruction converts the logical general register number into the physical general register number by using the current general window pointer and also the logical floating point register number into the physical floating point register number by using the current floating point window pointer. As a result, the data B(Li(2)) in the main memory address specified by L(2) contained in the physical general register $<1,20>$ is stored into the physical floating point register $<1,20>$.

No. 8 ADD instruction sets 2 into the physical general register 6. No. 9 CFRWPS instruction sets the value of the physical general register 6 into the current floating point window pointer, i.e., sets 2 into the window pointer. Likewise, No. 10 CGRWPS instruction sets the value of the physical general register 6 into the current general window pointer, i.e., sets 2 into the window pointer.

No. 11 GLDM instruction perform conversion from the logical general register number into the physical general register number by using the current general window pointer. This causes L(3), i.e., the "address of B(Li(3))" to be stored into the physical floating point register $<2,20>$.

No. 12 SUB instruction sets 1 into the physical general register 6. No. 13 CFRWPS instruction sets the value of the physical general register 6 into the current floating point window pointer, i.e., sets 1 into the window pointer. Likewise, No. 14 CGRWPS instruction sets the value of the physical general register 6 into the current general window pointer, i.e., sets 1 into the window pointer.

No. 15 GLDLIM instruction to No. 21 BCNT instruction form a loop, which is repetitively executed $N-3$ times. Let w stand for the value of the current floating point window pointer and WG for the value of the current general window pointer. Let us look at the loop that is executed the i-th time (i starts from 2). As is seen from the value of the physical general register 1, what is loaded into the physical general register $<WG+2,20>$ by No. 15 GLDLIM instruction is $L(i+2)$, i.e., "the address of $B(Li(i+2))$." It is seen from the value of the physical general register $<WG+1,20>$ that what is loaded into the physical floating point register $<w+1,20>$ by No. 16 FLDLI instruction is B(Li(i+1)). As is seen from the value of the general register 2, No. 17 FSTPOM instruction stores the value of the physical floating point register $<w-1,20>$ into the main memory address of A(i−1). No. 18 ADD instruction, No. 19 CFRWPS instruction and No. 20 CGRWPS instruction increment the current floating point window pointer by +1 and also the current general window pointer WG by +1 before the program returns to the start of the loop.

In one loop, the current floating point window pointer is assumed to have a value w and the current general window pointer a value WG. The address of data B(Li(i+2)), which will be stored into the physical floating point register $<w+2,20>$ in the next loop, i.e., $L(i+2)$, is stored into the physical general register $<WG+2,20>$. From the address of data B(Li(i+1)), i.e., $L(i+1)$, which was stored in the physical general register $<WG+1,20>$ in the previous loop, the data B(Li(i+1)) is read out and stored into the physical floating point register $<w+1,20>$. Data B(Li(i−1)), which was stored in the physical floating point register $<w-1,20>$ two loops before, is stored into the main memory address of A(i−1).

No. 22 through No. 28 instructions after leaving the loop call for processing on the unprocessed elements. No. 23 STPOM instruction stores B(Li(N−2)) into the main memory address of A(N−2). No. 27 FSTPOM instruction stores B(Li(N−1)) into the main memory address of A(N−1). No. 28 FSTM instruction stores B(Li(N)) into the main memory address of A(N).

As is seen from the processing within the loop, No. 15 GLDLIM instruction specifies the logic general register 20 and writes data into it and No. 16 FLDLI instruction specifies the logical general register 20 and reads data from it. It is noted, however, that the physical general registers 20 actually accessed by these instructions are different, that is, <wG+2,20> and <wG+1,20>. No. 16 FLDLI instruction specifies the logical floating point register number 20 and writes data into the floating point register and No. 17 FSTPOM instruction specifies the logical floating point register number 20 and reads data from the floating point register. It should be noted that the physical floating point registers actually accessed are different, i.e., <w+1,20> and <w−1,20>. Therefore, the phenomena that occurred with the program of FIG. 8—such as halting the execution of succeeding instructions until the data is read out—do not happen. In other words, the data reading need only be completed before the next loop is initiated, allowing the program to be executed at high speed. Further, only one each of logical floating point register and logical general register are specified by the program for vector data storage, whereas many floating point registers and general registers are required by the program of FIG. 12.

When compared with the program of FIG. 8, the program of FIGS. 14A and 14B has a greater overhead because it has additional processing of updating the current floating point window pointer and current general window pointer that is not included in the program of FIG. 8. For example, while the program loop of FIG. 8 is formed of four instructions, the program loop of FIGS. 14A and 14B consists of seven instructions. It is noted, however, that the overhead caused by the holding of execution of the succeeding instructions until the data is read out, as found in the program of FIG. 8, is much larger. The loop unrolling method of the program in FIG. 12 cannot be realized when the registers that can be specified by the program are all used up. Although it has overhead due to the updating of the current floating point window pointer and the current general window pointer, this method is therefore considered to be superior.

The equation (3) of the target index type calculation is realized by the program of FIGS. 15A and 15B when the above newly added functions are used.

Prior to execution of the program of FIGS. 15A and 15B, the vector L is assumed to be stored in a contiguous region in the main memory starting from address ad1. That is, the main memory address of L(1) is ad1 and that of L(2) is ad1+8. Likewise, the vector B is assumed to be stored in a contiguous region of the main memory starting from address ad2. The vector A is assumed to be stored in a contiguous region of the main memory starting from address ad3. It is also assumed that the general register 1 is preset with ad1, the general register 2 with ad2, the general register 4 with N−3, the general register 5 with 1, the general register 6 with 0, the current floating point window pointer with 0, the current general window pointer with 0, and the current window pointer valid register with 1. The vector L is a variation of the list vector Li as shown in equation (5).

Now, FIGS. 15A and 15B will be explained. No. 1 GLDM instruction performs conversion from the logical general register number into the physical general register number by using the current general window pointer and thus stores L(1), i.e., the address of A(Li(1)) into the physical general register <0,20>. No. 2 FLDM instruction converts the logical floating point register number into the physical floating point register number by using the current floating point window pointer and thus stores B(1) into the physical floating point register <0,20>.

No. 3 ADD instruction sets 1 to the physical general register 6 (the general register 6 is a global register and thus is not subjected to the logical general register number-physical general register number conversion). No. 4 CFRWPS instruction sets the value of the physical general register 6 into the current floating point window pointer, that is, sets 1 to the window pointer. Likewise, No. 5 CGRWPS instruction sets the value of the physical general register 6 into the current general window pointer to put 1 into the window pointer.

No. 6 GLDM instruction converts the logical general register number into the physical general register number by using the current general window pointer and thus stores L(2), i.e., the address of A(Li(2)), into the physical general register <1,20>. No. 7 FLDM instruction converts the logical floating point register number into the physical floating point register number by using the current floating point window pointer and thus stores B(2) into the physical floating point register <1,20>.

No. 8 ADD instruction sets 2 into the physical general register 6 (the general register 6 is a global register and therefore is not subjected to the conversion from the logical general register number to the physical general register number). No. 9 CFRWPS instruction sets the value of the physical general register 6 into the current floating point window pointer, that is, sets 2 to the window pointer. Likewise, No. 10 CGRWPS instruction sets the value of the physical general register 6 into the current general window pointer to put 2 into the window pointer.

No. 11 GLDM instruction converts the logical general register number into the physical general register number by using the current general window pointer and thus stores L(3), i.e., the address of A(Li(3)), into the physical general register <2,20>.

No. 12 SUB instruction sets 1 into the physical general register 6. No. 13 CFRWPS instruction sets the value of the physical general register 6 into the current floating point window pointer to put 1 in the window pointer. Similarly, No. 14 CGRWPS instruction sets the value of the physical general register 6 into the current general window pointer to put 1 in the window pointer.

No. 15 GLDLIM instruction to No. 21 BCNT instruction form a loop, which is repetitively executed N−3 times. Let w stand for the value of the current floating point window pointer and WG for the value of the current general window pointer let us look at the loop that is executed the i-th time (i starts from 2). As is seen from the value of the general register 1, what is loaded into the physical general register <WG+2,20> by No. 15 GLDLIM instruction is L(i+2), i.e., "the address of A(Li(i+2))." It is seen from the value of the general register 2 that what is loaded into the physical floating point register <w+1,20> by No. 16 FLDPRM instruction is B(i+1). No. 17 FSTLI instruction stores the value of the physical floating point register <w+1,20>, i.e., B(i−1) into the main memory address of A(Li(i−1)). No. 18 ADD instruction, No. 19 CFRWPS instruction and No. 20 CGRWPS instruction increment the current floating point window pointer by +1 and also the current general window pointer WG by +1 before the program returns to the start of the loop.

In one loop, the current floating point window pointer is assumed to have a value w and the current general window pointer a value WG. The address of data A(Li(i+2)), i.e., address L(i+2), in which B(i+2) will be stored three loops later, is stored into the physical general register <WG+2,20>. B(i+1), which is to be stored in the main memory two loops later, is stored in the physical floating point register <w+1,20>. B(i−1), which was stored in the physical floating point register <w−1,20> two loops before, is stored into the address of A(Li(i−1)), i.e., L(i−1), which was stored in the physical general register <WG-1,20> three loops before.

No. 22 through No. 28 instructions after leaving the loop call for processing on the unprocessed elements. No. 23 FSTLI instruction stores B(N−2) into the main memory address of A(Li(N−2)). No. 27 FSTLI instruction stores B(N−1) into the main memory address of A(Li(N−1)). No. 28 FSTM instruction stores B(N) into the main memory address of A(Li(N)).

As can be seen from the processing in the loop, while No. 15 GLDLIM instruction specifies the logical general register number 20 and writes data into the general register and No. 17 FSTLI instruction specifies the logical floating point register number 20 and reads data from the general register, the physical general registers actually accessed are different, i.e., <WG+2,20> and <WG-1,20>. No. 16 FLDPRM instruction specifies the logical floating point register number 20 and writes data into the floating point register and the immediately following No. 17 FSTLI instruction specifies the logical floating point register number 20 and reads data from the floating point register. It is noted that the actual physical floating point registers accessed are different, <w+1,20> and <w−1,20>. Therefore, the phenomena that occurred with the program of FIG. 9—such as halting the execution of succeeding instructions until the data is read out—do not happen. In other words, the data reading need only be completed before the next loop is initiated, allowing the program to be executed at high speed.

When compared with the program of FIG. 9, the program of FIGS. 15A and 15B has a greater overhead because it has additional processing of updating the current floating point window pointer and current general window pointer that is not included in the program of FIG. 9. For example, while the program loop of FIG. 9 is formed of four instructions, the program loop of FIGS. 15A and 15B consists of seven instructions. It is noted, however, that the overhead caused by the holding of execution of the succeeding instructions until the data is read out, as found in the program of FIG. 9, is much larger. Although it has overhead due to the updating of the current floating point window pointer and the current general window pointer, this method is therefore considered to be superior.

Using the above-mentioned new functions, the equation (4) for particle pusher type calculation is implemented by the program shown in FIGS. 16A and 16B.

Prior to execution of the program of FIGS. 16A and 16B, the vector L is assumed to be stored in a contiguous region in the main memory starting from address ad1. That is, the main memory address of L(1) is ad1 and that of L(2) is ad1+8. Likewise, the vector A is assumed to be stored in a contiguous region of the main memory starting from address ad3. The vector B is assumed to be stored in a contiguous region of the main memory starting from address ad2. It is also assumed that the general register 1 is preset with ad1, the general register 2 with ad2, the general register 4 with N−3, the general register 5 with 1, the general register 6 with 0, the current floating point window pointer with 0, the current general window pointer with 0, and the current window pointer valid register with 1. The vector L is a variation of the list vector Li as shown in equation (4).

Now, FIGS. 16A and 16B will be explained. No. 1 GLDM instruction performs conversion from the logical general register number into the physical general register number by using the current general window pointer and thus stores L(1) into the physical general register <0,20>. No. 2 FLDM instruction converts the logical floating point register number into the physical floating point register number by using the current floating point window pointer and also the logical general register number into the physical general register number by using the current general window pointer. The No. 2 instruction hence stores the main memory data at an address specified by L(1), i.e., A(Li(1)), into the physical floating point register <0,20>. No. 3 FLDM instruction converts the logical floating point register number into the physical floating point register number by using the current floating point window pointer and thus stores B(1) into the physical floating point register <0,20>. No. 4 FADD instruction converts the logical floating point register number into the physical floating point register number by using the current floating point window pointer, adds up the value of the physical floating point register <0,20> and the value of the physical floating point register <0,21>, and stores the result A(Li(1))+B(1) into the physical floating point register <0,20>. P No. 5 ADD instruction sets 1 into the physical general register 6 (the general register 6 is a global register from equation (10)). No. 6 CFRWPS instruction sets the value of the physical general register 6 into the current floating point window pointer, that is, sets 1 to the window pointer. Likewise, No. 7 CGRWPS instruction sets the value of the physical general register 6 into the current general window pointer to put 1 into the window pointer. No. 8 GLDM instruction converts the logical general register number into the physical general register number by using the current general window pointer and thus stores L(2), i.e., the address of A(-Li(2)), into the physical general register <1,20>. No. 9 FLDM instruction converts the logical floating point register number into the physical floating point register number by using the current floating point window pointer and also the logical general register number into the physical general register number by using the current general window pointer, and thus stores the main memory data at an address specified by L(2), i.e., A(-Li(2)), into the physical floating point register <1,20>. No. 10 FLDM instruction converts the logical floating point register number into the physical floating point register number by using the current floating point window pointer and thus stores the B(2) into the physical floating point register <1,21>.

No. 11 ADD instruction sets 2 into the physical general register 6. No. 12 CFRWPS instruction sets the value of the physical general register 6 into the current floating point window pointer, that is, sets 2 to the window pointer. Likewise, No. 13 CGRWPS instruction sets the value of the physical general register 6 into the current general window pointer to put 2 into the window pointer.

No. 14 GLDM instruction converts the logical general register number into the physical general register number by using the current general window pointer and thus stores L(3), i.e., the address of A(Li(3)), into the physical general register <2,20>. No. 15 SUB instruction sets 1 into the physical general register 6. No. 16 CFRWPS instruction sets the value of the physical general register 6 into the current floating point window pointer to put 1 in the window pointer. Similarly, No. 17 CGRWPS instruction sets the value of the physical general register 6 into the current general window pointer to put 1 in the window pointer.

No. 18 GLDLIM instruction to No. 26 BCNT instruction form a loop, which is repetitively executed N−3 times. Let w stand for the value of the current floating point window pointer and WG for the value of the current general window pointer. Let us look at the loop that is executed the i-th time (i starts from 2). As is seen from the value of the general register 1, what is loaded into the physical general register <WG+2,20> by No. 18 GLDLIM instruction is L(i+2), i.e., "the address of A(Li(i+2))." It is seen from the physical general register <WG+1,20> that what is loaded into the physical floating point register <w+1,20> by No. 19 FLDLI instruction is A(Li(i+1)). It is also seen from the value of the general register 2 that what is loaded into the physical floating point register <w+1,21> by No. 20 FLDPRM instruction is B(i+1). No. 21, FADD instruction adds up the value of the physical floating point register <w,20>, i.e., (Li(i)), and the value of the physical floating point register <w, 21>, i.e., B(i) and stores the result into the physical floating point register <w,20>. No. 21 FSTLI instruction stores the value of the physical floating point register <w−1,20>, i.e., A(Li(i−1))+B(i−1), into the main memory address specified by the general register <WG−1,20>, i.e., L(i−1) or the address of A(Li(i−1)). No. 23 ADD instruction, No. 24 CFRWPS instruction and No. 25 CGRWPS instruction increment the current floating point window pointer by +1 and also the current general window pointer WG by +1 before the program returns to the start of the loop.

In one loop, the current floating point window pointer is assumed to have a value w and the current general window pointer a value WG. No. 18 GLDLIM instruction reads from the main memory the address of data A(Li(i+2))—which is to be stored into the physical floating point register <w+2,20> in the next loop—that is, address L(i+2) or the address of A(Li(i+2)), and then stores the address into the physical general register <WG+2,20>. No. 19 FLDLI instruction reads A(Li(i+1)) from L(i+1) or the address of A(Li(i+1)), which was stored in the physical general register <WG+1,20> one loop before, and stores the data into the physical floating point register <w+1,20>. No. 20 FLDPRM instruction stores into the physical floating point register <w+1,21> data B(i+1) that is to be used in the addition calculation in the next loop. No. 21 FADD instruction adds up A(Li(i)) and B(i), which were loaded into the physical floating point registers <w, 20> and <w, 21> in the previous loop, and stores the result into the physical floating point register <w, 20>. No. 22 FSTLI instruction stores A(Li)(i−1))+B(i−1)—which was stored in the physical floating point register <w−1,20> one loop before—into the main memory address or L(i−1) (i.e., the address of A(Li(i−1))) that was loaded into the physical general register <WG-1,20> three loops before.

No. 28 through No. 36 instructions after leaving the loop call for processing on the unprocessed elements. No. 30 FSTLI instruction stores A(-Li(N−2))+B(N−2) into the main memory address of A(Li(N−2)). No. 35 FSTLI instruction stores A(-Li(N−1))+B(N−1) into the main memory address of A(Li(N−1)). No. 36 FSTM instruction stores A(-Li(N))+B(N)) into the main memory address of A(-Li(N)).

As can be seen from the processing in the loop, while No. 18 GLDLIM instruction specifies the logical general register number 20 and writes data into the general register and No. 19 FLDLI instruction specifies the logical general register number 20 and reads data from the general register, the physical general registers actually accessed are different, i.e., <WG+2,20> and <WG+1,20>. No. 19 FLDLI instruction specifies the logical floating point register number 20 and writes data into the floating point register and No. 21 FADD instruction specifies the logical floating point register number 20 and reads data from the floating point register. It is noted that the actual physical floating point registers accessed are different, <w+1,20> and <w, 20>. Further, No. 20 FLDPRM instruction specifies the logical floating point register number 21 and writes data into the floating point register and No. 20 FADD instruction specifies the logical floating point register number 21 and reads data from the floating point register. The actual physical floating point registers accessed, however, are different, i.e., <w+1,21> and <w, 21>. No. 21 FADD instruction specifies the logical floating point register number 20 and writes data into the floating point register and No. 22 FSTLI instruction specifies the logical floating point register number 20 and reads data from the floating point register. The actual physical floating point registers accessed, however, are different, i.e., <w,20> and <w−1,20>. Therefore, the phenomena that occurred with the program of FIG. 10—such as halting the execution of succeeding instructions until the data is read out—do not happen. In other words, the data reading need only be completed before the next loop is initiated, allowing the program to be executed at high speed.

When compared with the program of FIG. 10, the program of FIGS. 16A and 16B has a greater overhead because it has additional processing of updating the current floating point window pointer and current general window pointer that is not included in the program of FIG. 10. For example, while the program loop of FIG. 10 is formed of six instructions, the program loop of FIGS. 16A and 16B consists of nine instructions. It is noted, however, that the overhead caused by the holding of execution of the succeeding instructions until the data is read out, as found in the program of FIG. 10, is much larger. Although it has overhead due to the updating of the current floating point window pointer and the current general window pointer, this method is therefore considered to be superior.

In the list vector calculation—a part of the vector calculation in scientific and engineering computation—which mainly repeats executing the loop of instruction sequence, this invention changes the current floating point window pointer and the current general window pointer for each loop, i.e., changes the window to be used. In the source index type calculation, the i-th element is processed by the following steps: loading an i-th element of the list vector into a general register by the general register list load instruction in (i−2)-th loop; loading an element of the source vector (a vector to be read out) specified by the i-th element of the list vector into a floating point register—which uses data in the general register as its main memory address—by means of the floating point register list load instruction in the (i−1)-th loop; and storing data of the floating point register into an i-th element of the target vector (a vector to be written into) by means of a floating point register poststore instruction in the (i+1)-th loop. This series of operations increases the distances on the instruction string between the list vector loading, source vector loading and target vector storing operations on one element number, thereby eliminating performance degradation due to prolonged data read time and hence increasing the operation speed.

In the target index type calculation, the i-th element is processed by the following steps: loading an i-th element of the list vector into a general register by the general register list load instruction in (i−2)-th loop; loading an i-th element of the source vector (a vector to be read out) into a floating point register by a floating point register preload instruction in (i−1)-th loop; and storing into an element of the target vector specified by the i-th element of the list vector the data in the floating point register—which uses data in the general register as its main memory address—by means of the floating point register list store instruction in 2335 (i+1)-th loop. This series of operations increases the distances on the instruction string between the list vector loading, source vector loading and target vector storing operations on one element number, thereby eliminating performance degradation due to prolonged data read time and hence increasing the operation speed.

In the particle pusher type calculation, the i-th element is processed by the following steps: loading an i-th element of the list vector into a general register by the general register list load instruction in (i−2)-th loop; loading into a first floating point register an element of a first vector (i.e., vector A of equation (4)) specified by the i-th element of the list vector by means of the floating point register list load instruction in (i−1)-th loop; loading an i-th element of a second vector (i.e., vector B of equation (4)) into a second floating point register by means of the floating point register preload instruction; adding up the values of the two floating point registers (i.e., adding the element of the fist vector specified by the i-th element of the list vector and the i-th element of the second vector) by means of the floating point addition instruction in i-th loop; and storing the result of addition into the element of the first vector specified by the i-th element of the list vector, the element using the value of the general register as its main memory address. This series of operations increases the distances on the instruction string between various operations on one element number, i.e., between the list vector loading, first vector loading, second vector loading (first and second vector loading are performed in one loop because they are not related with each other), addition of the first and second vectors elements and storing of the addition result into the first vector, thereby eliminating performance degradation due to prolonged data read time and calculation execution time and hence increasing the operation speed.

Next, an embodiment of a data processor suitable for executing a list vector calculation will be described with reference to the accompanying drawings. FIG. 5 shows the data processor of this embodiment. In FIG. 5, like elements to those shown in FIG. 3 are represented by using identical reference numerals.

The main circuitry of the instruction processing unit 10 includes: a current floating point window pointer register 110 for storing a current floating point window pointer; a current general window pointer register 113 for storing a current general window pointer; a current window pointer valid register 111 for indicating that the current floating point window pointer and the current general window pointer are valid; a signal 115 representing the logic floating point register number specified by the instruction; a first conversion circuit 112 for converting the signal 115 into a physical floating point register number according to equations (6) to (10); a signal 116 representing the logical general register number specified by the instruction; and a second conversion circuit 114 for converting the signal 115 or 116 into a physical general register number according to equations (11) to (15). The signal 115 and signal 116 can carry a plurality of register numbers to permit execution of the instructions that specify a plurality of general register numbers or floating point register numbers.

The data processor, as shown in FIGS. 6A to 6H, is added with eight new instructions. These are shown in FIG. 6A as a current floating point window pointer change instruction, in FIG. 6B as a current general window pointer change instruction, in FIG. 6C as a floating point register preload instruction, in FIG. 6D as an extended floating point register preload instruction, in FIG. 6E as a floating point register poststore instruction, in FIG. 6F as a floating point register list load instruction, in FIG. 6G as a general register list load instruction, and in FIG. 6H as a floating point register list store instruction. The mnemonics and functions of these instructions have been described already.

The current floating point window pointer change instruction is one to specify a current floating point window pointer. In FIG. 6A, the instruction code indicates that the instruction is a current floating point window pointer change instruction. The general register number specifies a general register that contains the current floating point window pointer value to be set.

The current general window pointer change instruction is one to specify a current general window pointer. In FIG. 6B, the instruction code indicates that the instruction is a current general window pointer change instruction. The general register number specifies a general register that contains the current general window pointer value to be set.

The floating point register preload instruction is one to read data from the main memory address specified by the general register belonging to the current window and store the main memory data into a floating point register belonging to a window of (current floating point window pointer +1). In FIG. 6C, the instruction code represents the floating point register preload instruction. The floating point register number represents a logical floating point register number (r). The corresponding physical floating point register in which the data is stored has a number $<w+1,r>$ where w is a current floating point window pointer. The general register number represents a logical general register number (rG). The value of a physical general register $<wG,rG>$, where wG stands for the current general window pointer, represents a main memory address from which the data is to be read out. After the data is read out, the physical general register <wG,rG> is added with an increment value.

The extended floating point register preload instruction is one to read data from the main memory specified by the general register belonging to the current window and store the main memory data into a floating point register belonging to a window of (current floating point window pointer +2). In FIG. 6D, the instruction code indicates that the instruction is an extended floating point register preload instruction. The floating point register number represents a logical floating point register number (r). The corresponding physical floating point register in which the data is to be stored has a number <w+2,r> where w is a current floating point window pointer. The general register number represents a logical general register number (rG). The value of a physical general register <wG,rG>, where wG stands for the current general window pointer, represents a main memory address from which the data is to be read out. After the data is read out, the physical general register <wG,rG> is added with an increment value.

The floating point register poststore instruction is one to read data from a floating point register belonging to a window of (current floating point window pointer −1) and store data into the main memory address specified by the general register belonging to the current window. In FIG. 6E, the instruction code indicates that the instruction is a floating point register poststore instruction. The floating point register number represents a logic floating point register number (r). The corresponding physical floating point register from which the data is to be read out has a number <w+2,r> where w is a current floating point window pointer. The general register number represents a logical general register number (rG). The value of a physical general register <wG,rG>, where wG stands for the current general window pointer, represents a main memory address into which the data is to be stored. After the data is read out, the physical general register <wG,rG> is added with an increment value.

The floating point list load instruction reads data from a main memory address specified by the general register belonging to a window of (current general window pointer +1) and stores data into a floating point register belonging to a window of (current floating point window pointer +1). In FIG. 6F, the instruction code indicates that the instruction is a floating point register list load instruction. The floating point register number represents a logical floating point register number (r). The corresponding physical floating point register in which the data is to be stored has a number <w+1,r> where w is a current floating point window pointer. The general register number represents a logical general register number (rG). The value of a physical general register <wG+1,rG>, where wG stands for the current general window pointer, represents a main memory address from which the data is to be read out.

The general register list load instruction stores data from a main memory address specified by a general register belonging to the current window into a general register belonging to a window of (current general window pointer +2). In FIG. 4G, the instruction code indicates that the instruction is a general register list load instruction. The general register number 1 represents a logical general register number (rG1). The value of the physical general register <wG,rG1>, where wG stands for the current general window pointer, indicates a main memory address from which the data is to be read out. The general register number 2 represents a logical general register number (rG2). The number of a physical general register in which data is to be stored in <wG+2,rG2>. After the data is read out, the physical general register <wG,rG1> is added with an increment value.

The floating point register list store instruction reads data from a floating point register belonging to a window of (current floating point window pointer −1) and stores data into a main memory address specified by a general register belonging to a window of (current general window pointer −1). In FIG. 4H, the instruction code indicates that the instruction is a floating point register list store instruction. The floating point register number is a logical floating point register number (r). The physical floating point register from which the data is to be read out is numbered as <w−1,r> where w stands for the current floating point window pointer. The value of the physical general register <wG-1,r>, where wG stands for the current general window pointer, represents a main memory address in which the data is to be stored.

The operation of these instructions is explained below by referring to FIG. 5. First, let us explain about the current floating point window pointer change instruction. When an instruction is taken into the instruction register 101, the instruction is decoded by the instruction controller 102. When the instruction is identified to be a current floating point window pointer change instruction, the general register specified by the instruction is read and the value of that register is set in the current floating point window pointer register 110.

Next, the current general window pointer change instruction will be described. When an instruction is taken into the instruction register 101, the instruction is decoded by the instruction controller 102. When the instruction is identified to be a current general window pointer change instruction, the general register specified by the instruction is read and the value of that register is set in the current general window pointer register 113.

Next, the floating point register preload instruction is explained. When the instruction is taken into the instruction register 101, the instruction is decoded by the instruction controller 102. When the instruction is identified to be a floating point register preload instruction, the logical general register number (rG) specified by the instruction is transferred via the signal 116 to the second conversion circuit 114 where it is converted into a physical general register <wG,rG> where wG stands for the value of the current general window pointer register 113. The address adder 107 takes in the content of the physical general register and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the floating point register 105. The physical floating point register number in which the data is stored is determined by the first conversion circuit 112 as follows. The floating point register number specified by the instruction represents a logical floating point register number (r) and is transferred via the signal 115 to the first conversion circuit 112. The physical floating point register number is determined as <w+1,r> where w is the value of the current floating point window pointer register 110. After the data transfer has started, the general calculator 104 adds an increment value to the value of the physical general register <wG,rG>.

Next, the extended floating point register preload instruction is explained. When the instruction is taken into the instruction register 101, the instruction is decoded by the instruction controller 102. When the instruction is identified to be an extended floating point register preload instruction, the logical general register number (rG) specified by the instruction is transferred via the signal 116 to the second conversion circuit 114 where it is converted into a physical general register <wG,rG> where wG stands for the value of the current general window pointer register 113. The address adder 107 takes in the content of the physical general register and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the floating point register 105. The physical floating point register number in which the data is stored is determined by the first conversion circuit 112 as follows. The floating point register number specified by the instruction represents a logical floating point register number (r) and is transferred via the signal 115 to the first conversion circuit 112. The physical floating point register number is determined as <w+2,r> where w is the value of the current floating point window pointer register 110. After the data transfer has started, the general calculator 104 adds an increment value to the value of the physical general register <wG,rG>.

Next, the floating point register poststore instruction is explained. When the instruction is taken into the instruction register 101, the instruction is decoded by the instruction controller 102. When the instruction is identified to be a floating point register poststore instruction, the logical general register number (rG) specified by the instruction is transferred via the signal 116 to the second conversion circuit 114 where it is converted into a physical general register <wG,rG> where wG stands for the value of the current general window pointer register 113. The address adder 107 takes in the content of the physical general register and puts it out as a main memory address into which to store data. Data is read out from the floating point register 105, and the physical floating point register number from which the data is to be read out is determined by the first conversion circuit 112 as follows. The floating point register number specified by the instruction represents a logical floating point register number (r) and is transferred via the signal 115 to the first conversion circuit 112. The physical floating point register number is determined as <w−1,r> where w is the value of the current floating point window pointer register 110. The main memory access controller 109 searches through the cache 108 according to the main memory address. If the cache has a copy of data which is stored in the main memory address, the controller 109 replaces that data with the read data. When the data is not found in the cache, nothing is done about the cache. The main memory access controller 109 stores the read data into the main memory address via the memory control unit 20. After the data transfer has started, the general calculator 104 adds an increment value to the value of the physical general register <wG,rG>.

Next, the floating point register list load instruction is explained. When the instruction is taken into the instruction register 101, the instruction is decoded by the instruction controller 102. When the instruction is identified to be a floating point register list load instruction, the logical floating point register number (r) specified by the instruction is transferred via the signal 115 to the second conversion circuit 114 where it is converted into a physical general register <wG+1,r> where wG stands for the value of the current general window pointer register 113. The address adder 107 takes in the content of the physical general register and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the floating point register 105. The physical floating point register number in which the data is stored is determined by the first conversion circuit 112 as follows. The floating point register number specified by the instruction represents a logical floating point register number (r) and is transferred via the signal 115 to the first conversion circuit 112. The physical floating point register number is determined as <w+1,r> where w is the value of the current floating point window pointer register 110.

Next, the general register list load instruction is explained. When the instruction is taken into the instruction register 101, the instruction is decoded by the instruction controller 102. When the instruction is identified to be a general register list load instruction, the logical general register number 1 (rG1) or the first general register number specified by the instruction is transferred via the signal 116 to the second conversion circuit 114 where it is converted into a physical general register <wG,rG1> where wG stands for the value of the current general window pointer register 113. The address adder 107 takes in the content of the physical general register and puts it out as a main memory address from which to read data. The main memory access controller 109 searches through the cache 108 according to the main memory address. If there is desired data in the cache, the controller 109 transfers it from the cache and, when the data is not found, transfers data from the main memory 30 through the memory control unit 20. The transferred data is stored in the general register 103. The physical general register number in which the data is stored is determined by the second conversion circuit 114 as follows. The logical general register number 2 (rG2) or the second general register number specified by the instruction is transferred via the signal 116 to the second conversion circuit 114, where it is converted into a physical general register <wG+2,rG2>. After the data transfer has started, the general calculator 104 adds an increment value to the value of the physical general register <wG,rG1>.

Next, the floating point register list store instruction is explained. When the instruction is taken into the instruction register 101, the instruction is decoded by the instruction controller 102. When the instruction is identified to be a floating point register list store instruction, data is read out from the floating point register 105. The register number of the physical floating point register from which the data is read out is determined by the first conversion circuit 112 as follows. The floating point register number specified by the instruction is a logical floating point register number (r) and is transferred via the signal 115 to the first conversion circuit 112 where it is converted into a physical floating point register number $<w-1,r>$ where w stands for the value of the current floating point window pointer register 110. The logical floating point register number r is transferred via the signal 115 to the second conversion circuit 114 where it is converted into a physical general register number $<wG-1,r>$. The address adder 107 takes in the content of the physical general register and puts it out as a main memory address into which to store data from the physical floating point register. The main memory access controller 109 searches through the cache 108 according to the main memory address. If the cache has a copy of data which is stored in the main memory address, the controller 109 replaces that data with the read data. When the data is not found in the cache, nothing is done about the cache. The main memory access controller 109 stores the read data into the main memory address via the memory control unit 20.

In general floating point instructions (those using floating point registers, except for the floating point register preload instruction, extended floating point register preload instruction, floating point register poststore instruction, floating point register list load instruction, general register list load instruction and floating point register list store instruction), when the value of the current window pointer valid register 111 is "1," the logical floating point register number r specified by the instruction is converted by the first conversion logic 112 into a physical floating point register number, which is given by $<w,r>$ where w is the value of the current floating point window pointer register 110. Then, a reference is made to the physical floating point register represented by this derived physical floating point register number. When the current window pointer valid register 111 has a value "0," the logical floating point register number r specified by the instruction does not undergo conversion processing by the first conversion logic 112. As a result a reference is made to the physical floating point register specified by the physical floating point register number r.

In general instructions (those using general registers, except for the floating point register preload instruction, extended floating point register preload instruction, floating point register poststore instruction, floating point register list load instruction, general register list load instruction and floating point register list store instruction), when the value of the current window pointer valid register 111 is "1," the logical general register number rG specified in the instruction is converted by the second conversion logic 114 into a physical general register number, which is given by $<wG,rG>$ where wG is the value of the current general window pointer register 113. Then, a reference is made to the physical general register represented by this derived physical general register number. When the current window pointer valid register 111 has a value "0," the logical general register number rG specified by the instruction does not undergo conversion processing by the second conversion logic 114. As a result a reference is made to the physical general register specified by the physical general register number rG.

In the floating point register preload instruction, extended floating point register preload instruction, floating point register poststore instruction, floating point register list load instruction, general register list load instruction and floating point register list store instruction, when the value of the current window pointer valid register 111 is "1", the following conversions are performed as in the aforementioned instructions: conversion from the logical floating point register number into the physical floating point register number, conversion from the logical floating point register number into the physical general register number, and conversion from the logical general register number into the physical general register number. A reference is made to the physical floating point register or physical general register specified by the converted number. When the current window pointer valid register 111 has a value "0", the logical floating point register number is equal to the physical floating point register number in the conversion from the logical floating point register number into the physical floating point register number; the logical floating point register number is equal to the physical general register number in the conversion from the logical floating point register number into the physical general register number; and the logical general register number is equal to the physical general register number in the conversion from the logical general register number into the physical general register number.

The current window pointer valid register 111 may be assigned an idle bit of an existing register that stores control information of the data processing system and the validity bit may be set by using an existing instruction for storing a value in the register.

Described above is the way the following instructions work—the current floating point window pointer change instruction, the current general window pointer change instruction, the floating point register preload instruction, the extended floating point register preload instruction, the floating point register poststore instruction, the floating point register list load instruction, the general register list load instruction, the floating point register list store instruction, and common floating point instructions and general instructions under the control of the current floating point window pointer and the current general window pointer.

With the above embodiment, the programs shown in FIGS. 14A, 14B, 15A, 15B, 16A, and 16B can be implemented increasing the speed of the list vector calculation.

According to the method of this invention, the current floating point window pointer is changed to convert a floating point register number in an instruction into a different physical floating point register number, and the current general window pointer is changed to convert a floating point register number or general register number in the instruction into a different physical general register number, making it possible to access a greater number of physical registers than can be addressed by instructions, without changing the architecture of the data processor. This method realizes programs such as shown in FIGS. 14A, 14B, 15A, 15B, 16A, and 16B preventing performance degradation which would otherwise be caused by the holding of instruction execution due to prolonged data reading or register conflicts. This in turn ensures a faster execution of programs.

As can be seen from the programs of FIGS. 14A, 14B, 15A, 15B, 16A, and 16B, in the list vector calculation—a part of the vector calculation in scientific and engineering computation—which mainly repeats executing the loop of instruction sequence, this invention changes the window to be used. In the source index type calculation, the i-th element is processed by the following steps: loading an i-th element of the list vector into a general register by the general register list load instruction in (i−2)-th loop; loading an element of the source vector (a vector to be read out) specified by the i-th element of the list vector into a floating point register—which uses data in the general register as its main memory address—by means of the floating point register list load instruction in the (i−1)-th loop; and storing data of the floating point register into an i-th element of the target vector (a vector to be written into) by means of a floating point register poststore instruction in the (i+1)-th loop. This series of operations increases the distances on the instruction string between the list vector loading, source vector loading and target vector storing operations on one element number, thereby eliminating performance degradation due to prolonged data read time and hence increasing the operation speed. In the target index type calculation, the i-th element is processed by the following steps: loading an i-th element of the list vector into a general register by the general register list load instruction in (i−2)-th loop; loading an i-th element of the source vector (a vector to be read out) into a floating point register by a floating point register preload instruction in (i−1)-th loop; and storing into an element of the target vector specified by the i-th element of the list vector the data in the floating point register—which uses data in the general register as its main memory address—by means of the floating point register list store instruction in (i+1)-th loop. This series of operations increases the distances on the instruction string between the list vector loading, source vector loading and target vector storing operations on one element number, thereby eliminating performance degradation due to prolonged data read time and hence increasing the operation speed. In the particle pusher type calculation, the i-th element is processed by the following steps: loading an i-th element of the list vector into a general register by the general register list load instruction in (i−2)-th loop; loading into a first floating point register an element of a first vector (i.e., vector A of equation (3)) specified by the i-th element of the list vector by means of the floating point register list load instruction in (i−1)-th loop; loading an i-th element of a second vector (i.e., vector B of equation (3)) into a second floating point register by means of the floating point register preload instruction; adding up the values of the two floating point registers (i.e., adding the element of the first vector specified by the i-th element of the list vector and the i-th element of the second vector) by means of the floating point addition instruction in i-th loop; and storing the result of addition into the element of the first vector specified by the i-th element of the list vector, the element using the value of the general register as its main memory address. This series of operations increases the distances on the instruction string between various operations on one element number, i.e., between the list vector loading, first vector loading, second vector loading (first and second vector loading are performed in one loop because they are not related with each other), addition of the first and second vectors' elements and storing of the addition result into the first vector, thereby eliminating performance degradation due to prolonged data read time and calculation execution time and hence increasing the operation speed.

With this invention described in detail above, the current floating point window pointer is changed to convert a floating point register number in an instruction into a different physical floating point register number, and the current general window pointer is changed to convert a floating point register number or general register number in the instruction into a different physical general register number, making it possible to access a greater number of physical registers than can be addressed by instructions, without changing the architecture of the data processor. This method prevents performance degradation which would otherwise be caused by the holding of instruction execution due to prolonged data reading or register conflicts. This in turn ensures a faster execution of programs.

Particularly in a vector calculation in scientific and engineering computation which mainly repeats executing the loop of instruction sequence, a different window is allocated to each loop, and the i-th element is processed by loading an i-th element of the operand vector specified by the floating point preload instruction during the (i−1)-th loop, executing the calculation in the i-th loop, and storing the result storage vector by the floating point poststore instruction performed in the (i+1)-th loop. This processing increases the distance on the instruction sequence between load, calculation, and store instructions on one data, eliminating performance degradation due to prolonged data read time and calculation execution time and increasing the operation speed.

Furthermore, in list vector calculations in scientific and engineering computation which mainly repeats executing the loop of instruction sequence, such as a source index type calculation, target index type calculation, and particle pusher type calculation, a different window is allocated to each loop so that performance degradation due to prolonged data read time can be eliminated and the operation can be speeded up.

What is claimed is:

1. A data processor having main memory means for storing instructions and data, and instruction processing means for processing the instructions by using main memory data stored in said main memory means, said instruction processing means comprising:
   a plurality of physical registers more in number than can be addressed by instructions, said plurality of physical registers being divided into a plurality of partial groups as windows, and each of said plurality of physical registers being specified by a physical register number determined by a combination of a number of said window and a register number as a logical register number in an instruction;
   first and second window pointer storing means for storing window pointers indicating said numbers of said windows, one of said first and second window pointer storing means being used only by a register preload instruction and a remaining of said first and second window pointer storing means being used only by instructions other than said register preload instruction, a content of said two window pointer storing means being changed concurrently by said window pointer change instruction;
   conversion means for converting said logical register number into said physical register number by using said window pointer in response to said register preload instruction or a register poststore instruction;

instruction control means having a function for identifying
(1) a window pointer change instruction for changing said window pointers stored in said window pointer storing means;
(2) the register preload instruction for converting said logical register number into said physical register number by using a different value from said window pointer stored in said window pointer storing means for register preload instruction, said different value being determined from said window pointer stored in said window pointer storing means, and storing said main memory data in said physical register specified by said physical register number after conversion by the register preload instruction; and
(3) the register poststore instruction for converting said logical register number into said physical register number by using a window pointer having a different value from said window pointer stored in said window pointer storing means for instructions other than register preload instruction, said different value being determined from said window pointer stored in said window pointer storing means, and storing data into said main memory means from said physical register specified by said converted physical register number; and means for changing said window pointer stored in said window pointer storing means when said window pointer change instruction identified by said instruction control means is executed wherein.

2. A data processor having main memory means for storing instructions and data, and instruction processing means for processing the instructions by using main memory data stored in said main memory means, said instruction processing means comprising:

a plurality of physical registers more in number than can be addressed by instructions, said plurality of physical registers being divided into a .plurality of partial groups as windows, and each of said plurality of physical registers being specified by a physical register number determined by a combination of a number of said window and a register number as a logical register number in an instruction;

at least one window pointer storing means for storing a window pointer indicating said number of said window;

conversion means for converting said logical register number into said physical register number by using said window pointer in response to a register preload instruction or a register poststore instruction;

instruction control means having a function for identifying
(1) a window pointer change instruction for changing said window pointer stored in said window pointer storing means;
(2) the register preload instruction for converting said logical register number into said physical register number by using a different value from said window pointer stored in said window pointer storing means, said different value being determined from said window pointer stored in said window pointer storing means wherein said different value to be used by said register preload instruction is a value obtained by adding an optional integer number to the value stored in said window pointer storing means, and storing said main memory data in said physical register specified by said physical register number after conversion by the register preload instruction; and
(3) the register poststore instruction for converting said logical register number into said physical register number by using a window pointer having a different value from said window pointer stored in said window pointer storing means, said different value being determined from said window pointer stored in said window pointer storing means, and storing data into said main memory means from said physical register specified by said converted physical register number; and means for changing said window pointer stored in said window pointer storing means when said window pointer change instruction identified by said instruction control means is executed.

3. A data processor having main memory means for storing instructions and data, and instruction processing means for processing the instructions by using main memory data stored in said main memory means, said instruction processing means comprising:

a plurality of physical registers more in number than can be addressed by instructions, said plurality of physical registers being divided into a plurality of partial groups as windows, and each of said plurality of physical registers being specified by a physical register number determined by a combination of a number of said window and a register number as a logical register number in an instruction;

at least one window pointer storing means for storing a window pointer indicating said number of said window;

conversion means for converting said logical register number into said physical register number by using said window pointer in response to a register preload instruction or a register poststore instruction;

instruction control means having a function for identifying
(1) a window pointer change instruction for changing said window pointer stored in said window pointer storing means;
(2) the register preload instruction for converting said logical register number into said physical register number by using a different value from said window pointer stored in said window pointer storing means, said different value being determined from said window pointer stored in said window pointer storing means, and storing said main memory data in said physical register specified by said physical register number after conversion by the register preload instruction; and
(3) the register poststore instruction for converting said logical register number into said physical register number by using a window pointer having a different value from said window pointer stored in said window pointer storing means, said different value being determined from said window pointer stored in said window pointer storing means, and storing data into said main memory means from said physical register specified by said converted physical register number;

means for changing said window pointer stored in said window pointer storing means when said window pointer change instruction identified by said instruction control means is executed; and a cache for temporarily storing part of a content of said main memory means, wherein in reading said main memory data by said register preload instruction, the contents of said cache are not changed if said main memory data has not been stored in said cache, and in storing data in said main memory means by said register poststore instruction, the contents of said cache are not changed if said main memory data at a corresponding address has not been stored in said cache.

4. A data processor having main memory means for storing instructions and data, and instruction processing means for processing the instructions by using data stored in said main memory means, and executing a loop of a program, said data processor comprising:

a plurality of physical floating point registers more in number than floating point registers addressable by the instructions, said plurality of physical floating point registers being divided into a plurality of partial groups as windows, and each of said plurality of physical floating point registers being specified by a physical floating point register number determined by a combination of the number of said window and a floating point register number as a logical floating-point register number in each instruction;

at least one current floating point window pointer register for storing a current floating point window pointer indicating said window number;

a current floating point window pointer valid register for storing a value representing that said current floating point window pointer is valid;

conversion means for converting said logical floating point register number into said physical floating point register number by using said current floating point window pointer; and instruction control means for identifying, (1) a current floating point window pointer change instruction for changing said current floating point window pointer, (2) a floating point register preload instruction for converting said logical floating point register number into said physical floating point register number by said conversion means by using a current floating point window pointer having a different value from said current floating point window pointer stored in said current floating point window pointer register, said different value being determined from said current floating point window pointer stored in said current floating window pointer register, and storing said main memory data in said physical floating point register specified by said converted physical floating point register number, and (3) a floating point register poststore instruction for converting said logical floating point register number into said physical floating point register number by said conversion means by using a floating point window pointer having a different value from said floating point window pointer stored in said floating point window pointer register, said different value being determined from said floating point window pointer stored in said floating point window pointer register, and storing data into said main memory means from said physical floating point register specified by said converted physical floating point register number.

5. A processor having main memory means for storing instructions and data, and an instruction processing unit for processing instructions by using data stored in said main memory means and executing processing of a loop of a program, said comprising:

a plurality of physical floating point registers greater in number than floating point registers addressable by instructions, said plurality of physical floating point registers being divided into a plurality of partial groups as windows, and each of said plurality of physical floating point registers being specified by a physical floating point register number determined by a combination of the number of said window and a floating point register number as a logical register number in an instruction;

a current floating point window pointer register for storing a current floating point window pointer indicating said window number;

a first conversion circuit for converting said logical floating point register number into said physical floating point register number by using said current floating point window pointer;

a plurality of physical general registers greater in number than floating point registers addressable by instructions and greater in number than general registers addressable by instructions;

a current general window pointer register for storing a current general window pointer register to be used for converting one of said logical floating point register number and a general register number as a logical general register number in an instruction;

a second conversion circuit for converting one of said logical floating point register number and said logical general register number into said physical general register number by using said current general window pointer;

a current general window pointer valid register for storing a value representing that said current general window pointer is valid;

instruction control means for identifying, (1) a current floating point window pointer change instruction for changing said current floating point window pointer, (2) a current general window pointer change instruction for changing said current general window pointer, (3) a floating point register preload instruction for reading data from said main memory means at a main memory address stored in said physical general register specified by converting said logical general register number into said physical general register number by said second conversion circuit by using said current general window pointer, converting said logical floating point register number into said physical floating point register number by said first conversion circuit by using a current floating point window pointer having a different value from said current floating point window pointer stored in said current floating point window pointer register, said different value being determined from said current floating point window pointer stored in said current floating window pointer register, and storing said data in said physical floating point register specified by said converted physical floating point register number, and (4) a floating point register poststore instruction for reading data from said physical floating point register specified by said physical floating point register number converted from said logical floating point register number by said first conversion circuit by using a floating point window pointer having a different value from said floating point window pointer stored in said floating point window pointer register, said different value being determined from said floating point window pointer stored in said floating point window pointer register, and for storing said data into said main memory means at a main memory address stored in said physical general register specified by converting said logical general register number in said physical general register number by said second conversion circuit by using said current general window pointer wherein said instructions further include, a floating point register list load instruction for reading data from said main memory means at a main memory address stored in said physical general register specified by converting said logical floating point register number by said second conversion circuit by using a current general window pointer having a different value from said current general window pointer stored in said current general window pointer register, said different value being determined from said current general window pointer stored in said current general window pointer register, and storing said data in said physical floating point register specified by converting said logical floating point register number by said first conversion circuit by using a current floating point window pointer having a different value from said current floating point window pointer stored in said current floating point window pointer register, said different value being determined from said current floating point window pointer stored in said current floating point window pointer register, a general register list load instruction for reading data from said main memory means at a main memory address determined from information stored in said physical general register specified by converting a first said logical general register number by said second conversion circuit by using said current general window pointer, and storing said data in said physical general register specified by converting a second said logical general register number by said second conversion circuit by using a current general window pointer having a different value from said current general window pointer stored in said current general window pointer register, said different value being determined from said current general window pointer stored in said current general window pointer register, and a floating point register list store instruction for reading data from said physical floating point register specified by converting said logical floating point register number by said first conversion circuit by using a current floating point window pointer having a different value from said current floating point window pointer stored in said current floating point window pointer register, said different value being determined from said current floating point window pointer stored in said current floating window pointer register, and storing said data in said main memory means at a main memory address stored in said physical general register specified by converting said logical floating point register number by said second conversion circuit by using a current general window pointer having a different value from said current general window pointer stored in said current general window pointer register, said different value being determined from said current general window pointer stored in said current general window pointer register.

6. A data processor having main memory means for storing instructions and data, and instruction processing means for processing the instructions by using main memory data stored in said main memory means, said instruction processing means comprising:

a plurality of physical registers more in number than can be addressed by instructions, said plurality of physical registers being divided into a plurality of partial groups as windows, and each of said plurality of physical registers being specified by a physical register number determined by a combination of a number of said window and a register number as a logical register number in an instruction;

at least one window pointer storing means for storing a window pointer indicating said number of said window;

conversion means for converting said logical register number into said physical register number by using said window pointer in response to a register preload instruction or a register poststore instruction;

instruction control means having a function for identifying (1) a window pointer change instruction for changing said window pointer stored in said window pointer storing means;

(2) the register preload instruction for converting said logical register number into said physical register number by using a different value from said window pointer stored in said window pointer storing means, said different value being determined from said window pointer stored in said window pointer storing means, and storing said main memory data in said physical register specified by said physical register number after conversion by the register preload instruction; and (3) the register poststore instruction for converting said logical register number into said physical register number by using a window pointer having a different value from said window pointer stored in said window pointer storing means, said different value being determined from said window pointer stored in said window pointer storing means, and storing data into said main memory means from said physical register specified by said converted physical register number; and means for changing said window pointer stored in said window pointer storing means when said window pointer change instruction identified by said instruction control means is executed.

7. A data processor according to claim 6, wherein registers of the plurality of physical registers associated with said logical register number and said physical register number addressed by said instruction are floating point registers for storing floating point number.

8. A data processor according to claim 6, further comprising window pointer validity indicating means 111 for indicating that said window pointer stored in said window pointer storing means is valid.

9. A data processor according to claim 6, wherein the window pointer is changed as modulo a predetermined value when the window pointer change instruction is executed.

10. A data processor having main memory means for storing instructions and data, and instruction processing means for processing the instructions by using main memory data stored in said main memory means, said instruction processing means comprising:

a plurality of physical registers more in number than can be addressed by instructions, said plurality of physical registers being divided into a plurality of partial groups as windows, and each of said plurality of physical registers being specified by a physical register number determined by a combination of a number of said window and a register number as a logical register number in an instruction;

at least one window pointer storing means for storing a window pointer indicating said number of said window;

conversion means for converting said logical register number into said physical register number by using said window pointer in response to a register preload instruction or a register poststore instruction, wherein in converting said logical register number into said physical register number, at least one overlap register number is provided between a first set of said physical register numbers adapted to be converted from said logical register number by one of said window pointers and a second set of said physical register numbers adapted to be converted from said logical register number by another of said window pointers having a value different by 1 from the value of said one of said window pointers, at least one of said logical register numbers is converted into an equal physical register number called a global register number irrespective of the value of said window pointer, and each of said physical register numbers except said overlap register number and said global register number is derived by using a corresponding one of said window pointers;

instruction control means having a function for identifying (1) a window pointer change instruction for changing said window pointer stored in said window pointer storing means;

(2) the register preload instruction for converting said logical register number into said physical register number by using a different value from said window pointer stored in said window pointer storing means, said different value being determined from said window pointer stored in said window pointer storing means, and storing said main memory data in said physical register specified by said physical register number after conversion by the register preload instruction; and (3) the register poststore instruction for converting said logical register number into said physical register number by using a window pointer having a different value from said window pointer stored in said window pointer storing means, said different value being determined from said window pointer stored in said window pointer storing means, and storing data into said main memory means from said physical register specified by said converted physical register number; and means for changing said window pointer stored in said window pointer storing means when said window pointer change instruction identified by said instruction control means is executed.

11. A data processor according to claim 10, wherein the window pointer is changed as modulo a predetermined value when the window pointer change instruction is executed.

12. A processor having main memory means for storing instructions and data, and an instruction processing unit for processing instructions by using data stored in said main memory means and executing processing of a loop of a program, said instruction processing unit comprising:

a plurality of physical floating point registers greater in number than floating point registers addressable by instructions, said plurality of physical floating point registers being divided into a plurality of partial groups as windows, and each of said plurality of physical floating point registers being specified by a physical floating point register number determined by a combination of the number of said window and a floating point register number as a logical register number in an instruction;

a current floating point window pointer register for storing a current floating point window pointer indicating said window number;

a first conversion circuit for converting said logical floating point register number into said physical floating point register number by using said current floating point window pointer;

a plurality of physical general registers greater in number than floating point registers addressable by instructions and greater in number than general registers addressable by instructions;

a current general window pointer register for storing a current general window pointer register to be used for converting one of said logical floating point register number and a general register number as a logical general register number in an instruction;

a second conversion circuit for converting one of said logical floating point register number and said logical general register number into said physical general register number by using said current general window pointer; and a current general window pointer valid register for storing a value representing that said current general window pointer is valid; and instruction control means for identifying, (1) a current floating point window pointer change instruction for changing said current floating point window pointer, (2) a current general window pointer change instruction for changing said current general window pointer, (3) a floating point register preload instruction for reading data from said main memory means at a main memory address stored in said physical general register specified by converting said logical general register number into said physical general register number by said second conversion circuit by using said current general window pointer, converting said logical floating point register number into said physical floating point register number by said first conversion circuit by using a current floating point window pointer having a different value from said current floating point window pointer stored in said current floating point window pointer register, said different value being determined from said current floating point window pointer stored in said current floating window pointer register, and storing said data in said physical floating point register specified by said converted physical floating point register number, and (4) a floating point register poststore instruction for reading data from said physical floating point register specified by said physical floating point register number converted from said logical floating point register number by said first conversion circuit by using a floating point window pointer having a different value from said floating point window pointer stored in said floating point window pointer register, said different value being determined from said floating point window pointer stored in said floating point window pointer register, and for storing said data into said main memory means at a main memory address stored in said physical general register specified by converting said logical general register number in said physical general register number by said second conversion circuit by using said current general window pointer.

13. A processor according to claim 12, wherein said current floating-point and current general window pointer registers is an integrated current window pointer register.

* * * * *